US008054492B2

(12) United States Patent
Yoshida et al.

(10) Patent No.: US 8,054,492 B2
(45) Date of Patent: Nov. 8, 2011

(54) IMAGE SENDING APPARATUS, IMAGE SENDING SYSTEM AND IMAGE SENDING METHOD

(75) Inventors: Okihisa Yoshida, Amagasaki (JP);
Minako Kobayashi, Ikeda (JP);
Hirohisa Miyamoto, Kobe (JP);
Takehisa Yamaguchi, Ikoma (JP);
Katsuhiko Akita, Amagasaki (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 676 days.

(21) Appl. No.: 12/243,110

(22) Filed: Oct. 1, 2008

(65) Prior Publication Data

US 2009/0091788 A1 Apr. 9, 2009

(30) Foreign Application Priority Data

Oct. 3, 2007 (JP) ................................. 2007-260265

(51) Int. Cl.
*G06F 3/12* (2006.01)
*H04N 1/04* (2006.01)
(52) U.S. Cl. ....................................... 358/1.15; 358/474
(58) Field of Classification Search ................. 358/1.15, 358/474, 1.9, 444, 1.6, 438, 439, 440; 709/224, 709/218, 246
See application file for complete search history.

(56) References Cited

U.S. PATENT DOCUMENTS

| 7,239,434 | B2* | 7/2007 | Endo | 358/474 |
|---|---|---|---|---|
| 7,343,485 | B1* | 3/2008 | Huang et al. | 713/153 |
| 7,613,678 | B2 | 11/2009 | Koguchi | |
| 7,796,641 | B2* | 9/2010 | Wright et al. | 370/466 |
| 2006/0188864 | A1* | 8/2006 | Shah | 434/350 |
| 2007/0067490 | A1* | 3/2007 | Grimminger et al. | 709/245 |
| 2007/0198656 | A1* | 8/2007 | Mazzaferri et al. | 709/218 |
| 2007/0239896 | A1* | 10/2007 | Sohn et al. | 709/246 |
| 2007/0273919 | A1* | 11/2007 | Oomura | 358/1.15 |
| 2009/0019152 | A1* | 1/2009 | Huang | 709/224 |
| 2011/0047261 | A1* | 2/2011 | Gobara et al. | 709/224 |

FOREIGN PATENT DOCUMENTS

JP        2003-108479 A        4/2003

(Continued)

OTHER PUBLICATIONS

Notification of Reasons for Rejection issued in corresponding Japanese Application No. 2007-260265 dated Sep. 24, 2009, and an English Translation thereof.

*Primary Examiner* — Jerome Grant, II
(74) *Attorney, Agent, or Firm* — Buchanan Ingersoll & Rooney PC

(57) ABSTRACT

An image sending system including a server and a plurality of image sending apparatuses. The server (i) receives sending method specification information specified by a receiver and indicating a sending method for image data addressed to the receiver, (ii) records the sending method specification information and an identifier of the receiver in association with each other, (iii) and receives updated sending method specification information and rewrites the recorded sending method specification information with the updated sending method specification information. Each image sending apparatus (i) receives a selection of an identifier of a receiver of image data to be sent, (ii) obtains from the server the recorded sending method specification information and identification of the receiver, and (iii) when the identifier of receiver in the received selection matches the obtained identifier of receiver, sends the image data 505 by the sending method indicated by the obtained sending method specification information.

18 Claims, 18 Drawing Sheets

FOREIGN PATENT DOCUMENTS

| | | |
|---|---|---|
| JP | 2003-244308 A | 8/2003 |
| JP | 2005-12414 A | 1/2005 |
| JP | 2005-33733 A | 2/2005 |
| JP | 2005-210547 | 8/2005 |
| JP | 2006-011985 | 1/2006 |
| JP | 2006-20049 A | 1/2006 |
| JP | 2006157516 * | 6/2006 |
| JP | 2007-251289 | 9/2007 |

* cited by examiner

FIG. 9

| IMAGE SENDING APPARATUS | SENDING FUNCTION INFORMATION ||||| 
|---|---|---|---|---|---|
| | WebDav | SMB | FTP | E-mail | FAX |
| MFP1 | ○ | ○ | ○ | ○ | ○ |
| MFP2 | × | × | ○ | ○ | ○ |
| MFP3 | × | × | × | ○ | ○ |
| MFP4 | × | ○ | ○ | ○ | ○ |
| MFP5 | ○ | ○ | ○ | ○ | ○ |
| . . . | . . . | . . . | . . . | . . . | . . . |
| . . . | . . . | . . . | . . . | . . . | . . . |
| . . . | . . . | . . . | . . . | . . . | . . . |

FIG. 17

WARNING!!

1ST PREFERRED SENDING METHOD OF Mr. B
CANNOT BE EXECUTED ON THIS APPARATUS.

SEND BY 2ND PREFERRED SENDING METHOD?

YES          NO

IMAGE SENDING APPARATUS, IMAGE SENDING SYSTEM AND IMAGE SENDING METHOD

This application is based on application No. 2007-260265 filed in Japan, the contents of which are hereby incorporated by reference.

BACKGROUND OF THE INVENTION (1) Field of the Invention

The present invention relates to an image sending apparatus for sending a scanned and input image or the like to another apparatus connected via a network, in particular to a technology for optimizing a method of such sending.

(2) Description of the Related Art

In recent years, image sending apparatuses have been in widespread use that send image data input thereto to a destination via a network by a sending method preferred by the user (e-mail, fax, FTP, internet fax or the like).

In addition, along with the improvement of a network environment, various networks have been available as methods of sending image data.

Under such circumstances, in the case where a sender sends the above image data to the destination, he/she selects an appropriate one from available multiple sending methods.

As technologies of selecting a sending method on such an image sending apparatus, a technology (Japanese Patent Application Publication No. 2005-12414) is disclosed which lets the sender to choose an appropriate sending method from a list of sending methods for a destination that have in advance been registered to the image sending apparatus.

Herewith, using the image sending apparatus, the sender can readily and quickly select a sending method to send image data to the destination.

However, this conventional technology involves an issue in which, since the sending method is selected by the sender, the image data may be sent by a method that does not suit the receiver's needs.

The problem could be that, for example, the image data sent by a sending method that has been registered in the image sending apparatus cannot be received because the receiver has been reassigned to another department or to another office and then his/her receiving equipment has been changed. Another problem would be that the receiver is temporarily visiting a different office on business and therefore cannot receive, at the visiting office, image data sent by a registered sending method.

SUMMARY OF THE INVENTION

The present invention takes into the above-mentioned problems, and aims at offering an image sending method and an image sending apparatus that are capable of sending image data by a sending method that suits the receiver's needs, as well as offering an image sending system including such an image sending apparatus.

In order to solve the above issue, the present invention is an image sending system in which a server providing sending methods for image data and a plurality of image sending apparatuses are network-connected. Here, the server includes: a recording medium; a registration update reception unit operable to receive a registration and an update of sending method specification information specified by a receiver and indicating a sending method for image data addressed to the receiver; and a recording controller operable to, (i) when the registration is received, record on the recording medium the sending method specification information and an identifier of the receiver in association with each other, and (ii) when the update is received, rewrite the recorded sending method specification information with updated sending method specification information. Each of the plurality of image sending apparatuses includes: a selection reception unit operable to receive a selection of an identifier of a receiver of image data to be sent; an obtaining unit operable to obtain from the server the recorded sending method specification information and identifier of the receiver; and a sending controller operable to, when the identifier of the receiver in the received selection matches the obtained identifier of the receiver, send the image data to be sent by the sending method indicated by the obtained sending method specification information (Structure 1).

Further, the present invention is an image sending apparatus network-connected to a server providing sending methods for image data. Here, the server (i) includes a recording medium, (ii) receives a registration and an update of sending method specification information specified by a receiver and indicating a sending method for image data addressed to the receiver, (iii) records on the recording medium, when the registration is received, the sending method specification information and an identifier of the receiver in association with each other, and (iv) rewrites, when the update is received, the recorded sending method specification information with updated sending method specification information. The image sending apparatus comprises: a selection reception unit operable to receive a selection of an identifier of a receiver of image data to be sent; an obtaining unit operable to obtain from the server the recorded sending method specification information and identifier of the receiver; and a sending controller operable to, when the identifier of the receiver in the received selection matches the obtained identifier of the receiver, send the image data to be sent by the sending method indicated by the obtained sending method specification information (Structure 2).

Further, the present invention is an image sending method used on an image sending apparatus network-connected to a server providing sending methods for image data. Here, the server (i) includes a recording medium, (ii) receives a registration and an update of sending method specification information specified by a receiver and indicating a sending method for image data addressed to the receiver, (iii) records on the recording medium, when the registration is received, the sending method specification information and an identifier of the receiver in association with each other, and (iv) rewrites, when the update is received, the recorded sending method specification information with updated sending method specification information. The image sending method comprises: a selection reception step of receiving a selection of an identifier of a receiver of image data to be sent; an obtaining step of obtaining from the server the recorded sending method specification information and identifier of the receiver; and a sending control step of, when the identifier of the receiver in the received selection matches the obtained identifier of the receiver, sending the image data to be sent by the sending method indicated by the obtained sending method specification information (Structure 3).

According to the above structures, the present invention allows a receiver to make image data addressed to the receiver sent from the sender by a sending method having been set by the receiver. Accordingly, the user is able to effectively prevent image data addressed to him/her from being sent by an unwanted sending method.

In Structure 1, the sending method specification information may include a plurality of sending methods, to which priority has been assigned. Here, the sending controller includes: a storage storing therein sending function information which indicates one or more sending methods executable on the image sending apparatus; and a selection unit operable to, when the identifier of the receiver in the received selection matches the obtained identifier of the receiver, select in reference to the sending function information, as the sending method for the image data to be sent, a sending method which is executable on the image sending apparatus and to which highest priority has been assigned from among the plurality of sending methods.

Further, the sending method specification information may include, as a $1^{st}$ preferred sending method to which the highest priority has been assigned, a sending method executable on one of the plurality of image sending apparatuses, and as a $2^{nd}$ preferred sending method to which second highest priority has been assigned, a sending method executable on all of the plurality of image sending apparatuses (Structure 4).

Further, the sending method specification information may include, as a $1^{st}$ preferred sending method to which the highest priority has been assigned, a sending method executable on one of the plurality of image sending apparatuses, and as a $2^{nd}$ preferred sending method to which second highest priority has been assigned, a sending method executable commonly on, among the plurality of image sending apparatuses, image sending apparatuses that cannot execute the $1^{st}$ preferred sending method (Structure 5).

In Structure 2, the server may be connected to a plurality of image sending apparatuses in which the image sending apparatus is included. Here, the sending method specification information includes a plurality of sending methods, to which priority has been assigned. The sending controller includes: a storage storing therein sending function information which indicates one or more sending methods executable on the image sending apparatus; and a selection unit operable to, when the identifier of the receiver in the received selection matches the obtained identifier of the receiver, select in reference to the sending function information, as the sending method for the image data to be sent, a sending method which is executable on the image sending apparatus and to which highest priority has been assigned from among the plurality of sending methods.

Further, the sending method specification information may include, as a $1^{st}$ preferred sending method to which the highest priority has been assigned, a sending method executable on one of the plurality of image sending apparatuses, and as a $2^{nd}$ preferred sending method to which second highest priority has been assigned, a sending method executable on all of the plurality of image sending apparatuses (Structure 6).

Further, the sending method specification information may include, as a $1^{st}$ preferred sending method to which the highest priority has been assigned, a sending method executable on one of the plurality of image sending apparatuses, and as a $2^{nd}$ preferred sending method to which second highest priority has been assigned, a sending method executable commonly on, among the plurality of image sending apparatuses, image sending apparatuses that cannot execute the $1^{st}$ preferred sending method (Structure 7).

In structure 3, the server may be connected to a plurality of image sending apparatuses in which the image sending apparatus is included. Here, each of the plurality of image sending apparatuses has a storage storing therein sending function information which indicates one or more sending methods executable on the image sending apparatus. The sending method specification information includes a plurality of sending methods, to which priority has been assigned, and a selection step of, when the identifier of the receiver in the received selection matches the obtained identifier of the receiver, selecting in reference to the sending function information, as the sending method for the image data to be sent, a sending method which is executable on the image sending apparatus and to which highest priority has been assigned from among the plurality of sending methods.

Further, the sending method specification information may include, as a $1^{st}$ preferred sending method to which the highest priority has been assigned, a sending method executable on one of the plurality of image sending apparatuses, and as a $2^{nd}$ preferred sending method to which second highest priority has been assigned, a sending method executable on all of the plurality of image sending apparatuses (Structure 8).

Further, the sending method specification information may include, as a $1^{st}$ preferred sending method to which the highest priority has been assigned, a sending method executable on one of the plurality of image sending apparatuses, and as a $2^{nd}$ preferred sending method to which second highest priority has been assigned, a sending method executable commonly on, among the plurality of image sending apparatuses, image sending apparatuses that cannot execute the $1^{st}$ preferred sending method (Structure 9).

Herewith, on the image sending apparatus used by the sender, a sending method having the highest priority having been set by the receiver is selected from among the executable sending methods as the sending method for image data addressed to the receiver. Accordingly, in the case where image data is to be sent in a use environment in which multiple image sending apparatuses having different sending functions are used, an appropriate image sending method can be selected in consideration of sending methods preferred by the receiver as well as the difference in sending functions between the image sending apparatuses. Thus, the operation of selecting an image sending method can be optimized, reflecting the receiver's preference.

In Structures 4-7, the sending controller may further include: a notification unit operable to, in a case where the $1^{st}$ preferred sending method cannot be executed on the image sending apparatus, notify to the user the $1^{st}$ preferred sending method being not executable on the image sending apparatus; and an instruction reception unit operable to receive instruction of whether to use the $2^{nd}$ preferred sending method. Here, the selection unit selects the $2^{nd}$ preferred sending method in a case where the instruction indicates use of the $2^{nd}$ preferred sending method.

In Structures 8 and 9, the sending control step may further include: a notification step of, in a case where the $1^{st}$ preferred sending method cannot be executed on the image sending apparatus, notifying to the user the $1^{st}$ preferred sending method being not executable on the image sending apparatus; and an instruction reception step of receiving instruction of whether to use the $2^{nd}$ preferred sending method. Here, the selection step of selecting the $2^{nd}$ preferred sending method in a case where the instruction indicates use of the $2^{nd}$ preferred sending method.

Herewith, in the case where the $1^{st}$ preferred sending method cannot be executed on the image sending apparatus in use, the sender of the image data will be notified accordingly. In this way, it is possible to send out an alerting message to the sender of the image data and to give him/her an opportunity to make a judgment on whether to send the image data by selecting the second preferred sending method, or whether to send the image data by using another image sending apparatus on which the $1^{st}$ preferred sending method can be executed.

BRIEF DESCRIPTION OF THE DRAWINGS

These and other objects, advantageous effects and features of the invention will become apparent from the following description thereof taken in conjunction with the accompanying drawings which illustrate specific embodiments of the invention.

In the drawings:

FIG. 9 shows a specific example of apparatus information stored in an apparatus information storage 202;

FIG. 17 shows a specific example of a warning message screen;

DESCRIPTION OF THE PREFERRED EMBODIMENT

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

The following describes the best mode of practicing the present invention.

[Configuration]

Figure 1:
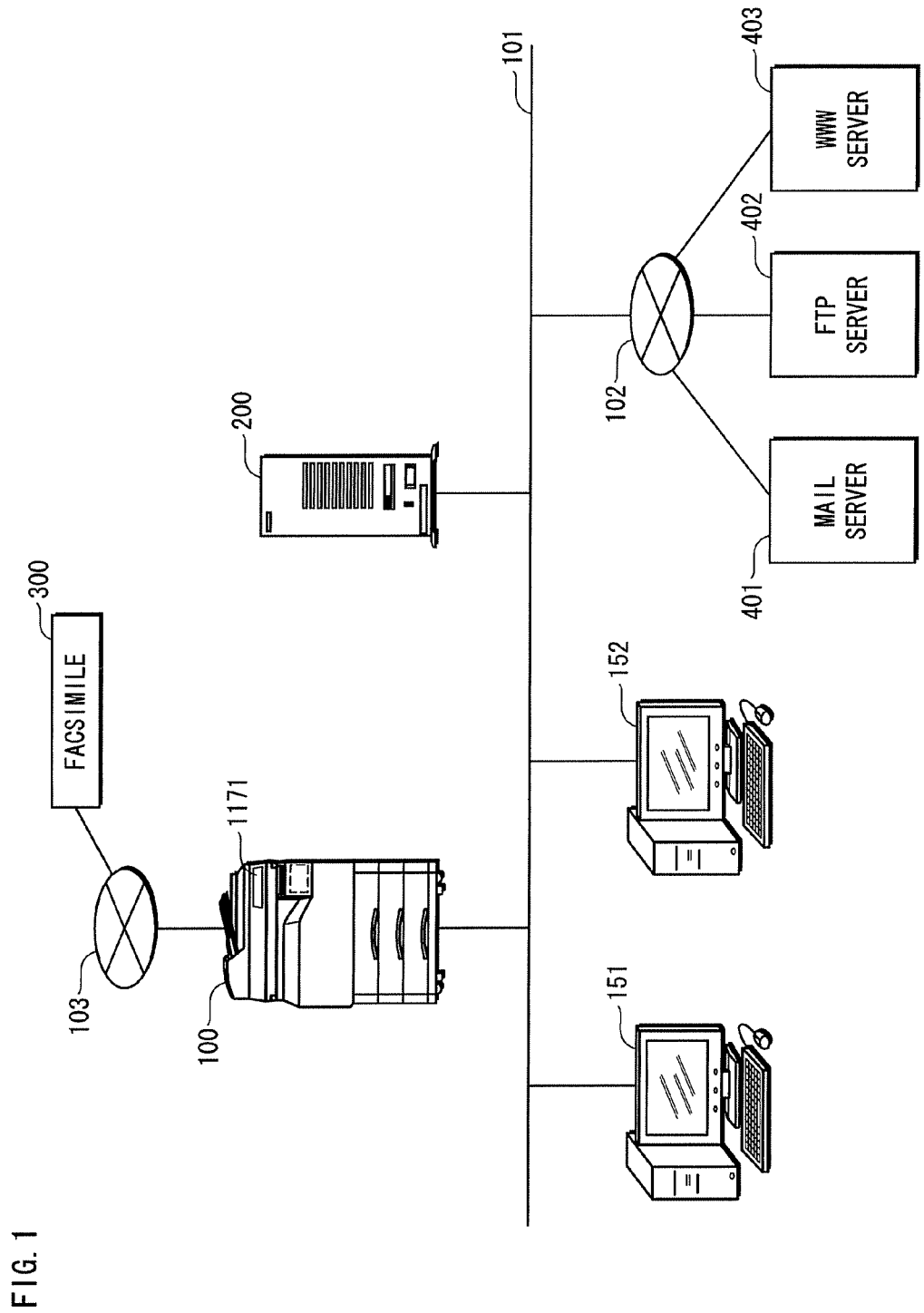
FIG. 1 shows a configuration of an image sending system 1000 in accordance with an embodiment of the present invention.

FIG. 1 shows a configuration of an image sending system 1000 in accordance with the embodiment. The image sending system 1000 includes an image sending apparatus 100, personal computers (hereinafter, referred to as "PCs") 151 and 152, and an address book server 200. Individual components of the image sending system 1000 are connected to each other via LAN (Local Area Network) 101.

The LAN 101 is connected to the Internet 102, and the image sending system 1000 is connected to a mail server 401, an FTP server 402 and a WWW server 403 via the Internet 102.

Individual components connected by the LAN 101 and the Internet 102 are interconnected in compliance with the TCP (Transport Control Protocol)/IP (Internet Protocol) protocol, on which various communications with the WebDAV (Distributed Authoring and Versioning for the WWW), SMB (Server Message Block), SMTP (Simple Mail Transport Protocol) and FTP (File Transfer Protocol) can be made.

In addition, the image sending apparatus 100 is connected to a communication network 103 formed by a telephone line, and is able to perform fax communication with an external facsimile 300 via the communication network 103.

Although FIG. 1 shows only one image sending apparatus 100 for convenience of explanation, the image sending system 1000 may include therein multiple image sending apparatuses 100.

(Image Sending Apparatus 100)

(Hardware Configuration)

The image sending apparatus 100 of the present embodiment includes: a microprocessor; ROM; RAM; hard disk unit; operation panel used to input an instruction (a, touch panel, or a panel including multiple input keys, a liquid crystal display and the like); scanner; printer which is an image printer such as a laser printer; and facsimile. A computer program is stored in the RAM or the hard disk unit. The microprocessor operates according to the computer program, and thereby the image sending apparatus 100 fulfills each function of the functional components described below. Here, the computer program is integration of multiple operation codes that indicate instructions to a, computer for realizing predetermined functions.

(Functional Components)

Figure 2:
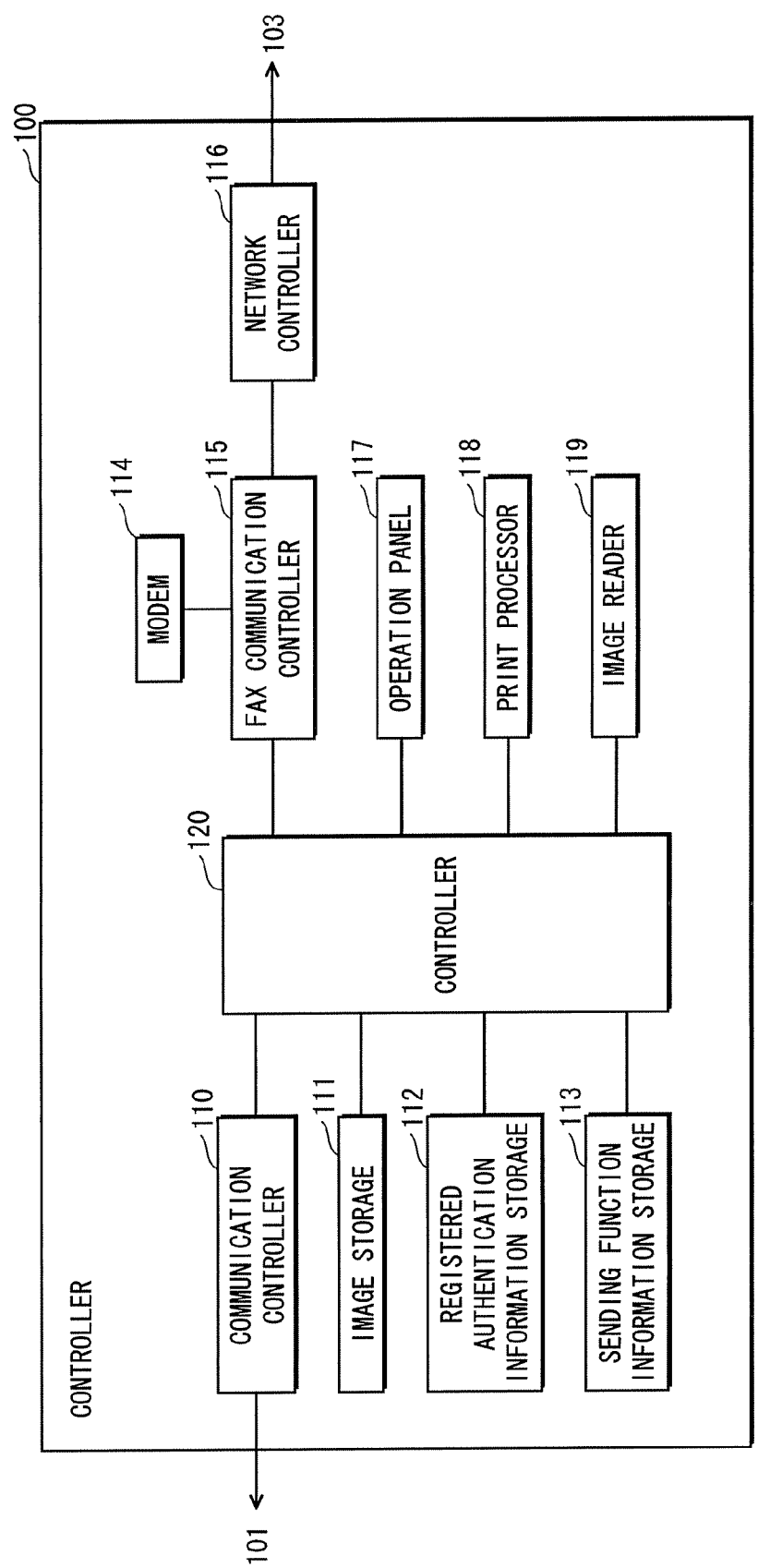
FIG. 2 is a functional block diagram showing functional components of an image sending apparatus 100.

FIG. 2 is a functional block diagram showing functional components of the image sending apparatus 100. The image sending apparatus 100 includes, as shown in FIG. 2: a communication controller 110; an image storage 111; a registered authentication information storage 112; a sending function information storage 113; a modem 114; a fax communication controller 115; a network controller 116; an operation panel 117; a print processor 118; an image reader 119; and a controller 120.

(Communication Controller 110)

The communication controller 110 is an interface for making a connection to the LAN 101, and controls communication with individual components of the image sending system 1000 connected to the LAN 103. The communication is controlled under a predetermined protocol such as the TCP/IP.

(Image Storage 111)

The image storage 111 stores therein image data to be sent, which has been input by the image reader 119 and the communication controller 110.

(Registered Authentication Information Storage 112)

The registered authentication information storage 112 stores therein registered authentication information of each user having already been registered as a user allowed to use the image sending apparatus 100.

Here, the "registered authentication information" is information made up of the name of each user allowed to use the image sending apparatus 100 and the user's password.

(Sending Function Information Storage 113)

The sending function information storage 113 stores therein sending function information indicating sending methods executable on its own image sending apparatus 100. Here, a sending method is information related to a sending protocol (e.g. WebDAV, SMB, SMTP, or FTP) and/or a sending function (e.g. fax).

(Modem 114)

The modem 114 is used to modulate a sending signal to be sent to the image sending apparatus 100 on the other side of the communication and demodulate a sending signal sent from the image sending apparatus 100 on the other side.

(Fax Communication Controller 115)

Via the modem 114, the fax communication controller 115 modulates a sending signal to be sent to the image sending apparatus 100 on the other side of the communication and demodulates a sending signal sent from the image sending apparatus 100 on the other side.

In addition, via the network controller 116, the fax communication controller 115 is connected to the communication network 103 to communicate the image sending apparatus 100 on the other side.

(Network Controller 116)

The network controller 116 is used for connection to the communication network 103.

(Operation Panel 117)

The operation Panel 117 includes multiple input keys and a display (e.g. liquid crystal display) indicated by the reference numeral 1171 of FIG. 1, and a touch panel is disposed on the surface of the display 1171. The operation panel 117 receives an instruction from the user, which is made by touch input on the touch panel or by key input on the input keys, and notifies the instruction to the controller 120.

(Print Processor 118)

The print processor 118 prints on a print sheet based on image data input from the controller 120.

(Image Reader 119)

The image reader 119 is formed with an image input apparatus, such as a scanner. The image reader 119 irradiates images of characters, figures, tables or photographs recorded on a paper sheet with a built-in light source, focuses a reflected image on solid-state image sensing devices by a lens, and performs conversion to an image signal via the solid-state image sensing devices to generate image data.

(Controller 120)

The controller 120 performs the entire control of the image sending apparatus 100 as well as a personal address book registration process, a receiver setting registration process and an image sending process to be hereinafter described.

(Address Book Server 200)

(Hardware Configuration)

The address book server 200 includes: a microprocessor; ROM; RAM; hard disk unit; keyboard for instruction input; mouse; display unit formed with a liquid crystal display or a CRT. A computer program is stored in the RAM or the hard disk unit. The microprocessor operates according to the computer program, and thereby the address book server 200 fulfills each function of the functional components described below.

(Functional Components)

Figure 3:
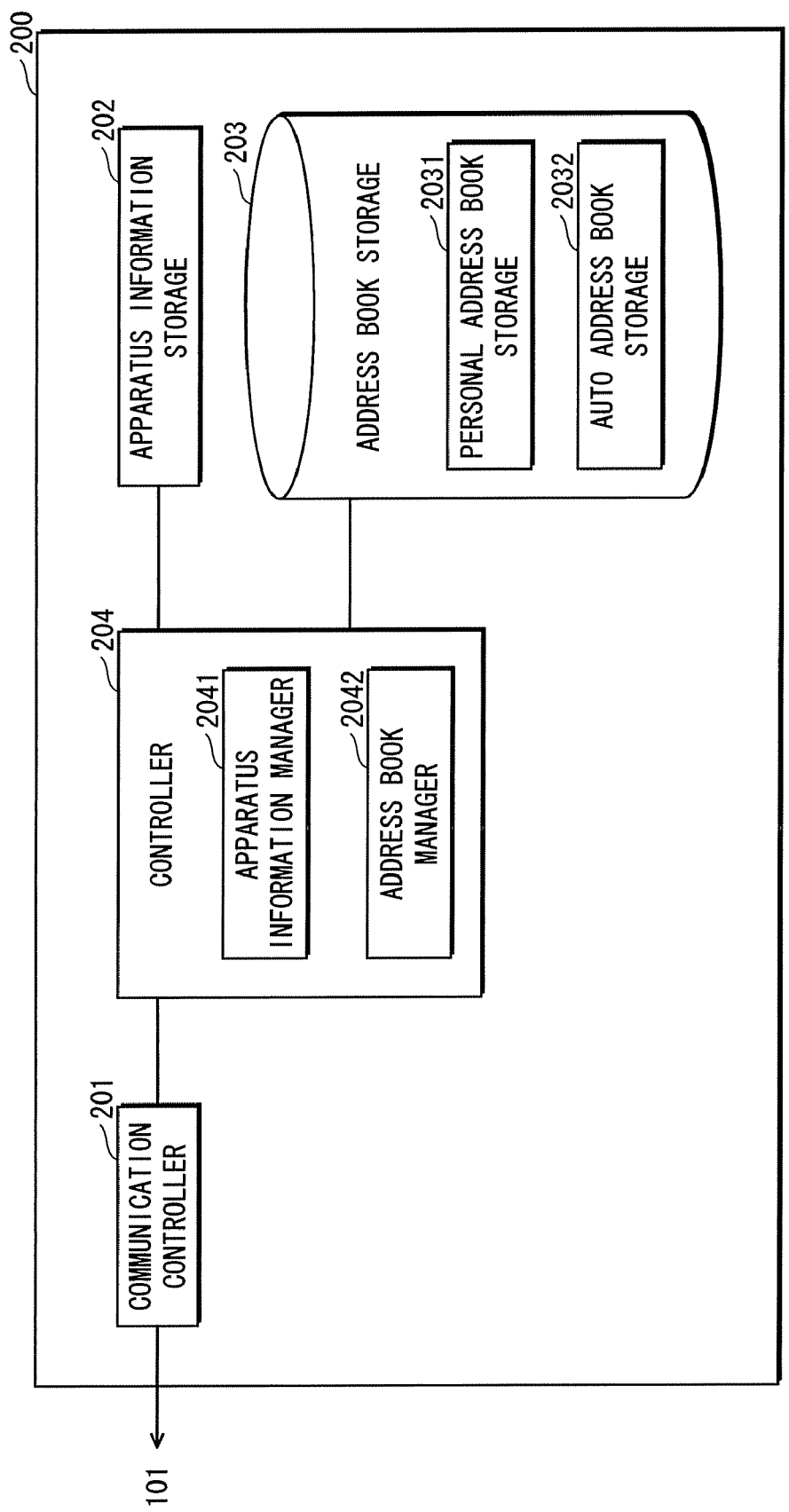
FIG. 3 is a functional block diagram showing functional components of an address book server 200.

FIG. 3 is a functional block diagram showing functional components of the address book server 200.

The address book server 200 includes a communication controller 201, an apparatus information storage 202, an address book storage 203 and a controller 204.

(Communication Controller 201)

The communication controller 201 is an interface for connection to the LAN 101, and controls communication with each component element of the image sending system 1000. This communication is controlled under a predetermined protocol such as the TCP/IP.

(Apparatus Information Storage 202)

The apparatus information storage 202 stores therein apparatus information. Here, the "apparatus information" is information showing a correspondence relationship between each image sending apparatus 100 within the image sending system 1000 and its sending function information. FIG. 9 shows a specific example of the apparatus information stored in the apparatus information storage 202. The symbol "O" of FIG. 9 indicates an executable sending method on a corresponding image sending apparatus 100 while the symbol "X" of FIG. 9 indicates a non-executable sending method on the image sending apparatus 100.

(Address Book Storage 203)

The address book storage 203 includes a personal address book storage 2031 and an auto address book storage 2032.

(Personal Address Book Storage 2031)

The personal address book storage 2031 stores therein a personal address book set by each user of the image sending system 1000.

Here, the "personal address book" means information including therein setter information, sending destination setting information and receiver setting information.

The "setter information" is information for identifying a setter of each personal address book (e.g. the name of the setter).

The "receiver setting information" is information set by the setter of the personal address book and specifying a sending method and a sending destination for image data addressed to the setter. In the receiver setting information, a $1^{st}$ preferred sending method and its sending destination and a $2^{nd}$ preferred sending method and its sending destination are specified.

Here, the "$1^{st}$ preferred sending method" indicates a sending method to which the highest priority has been assigned, and the "$2^{nd}$ preferred sending method" indicates a sending method to which the second highest priority has been assigned.

The "receiver setting information" is included in the personal address book only when the setter of the personal address book has set this information, and therefore, the information is not included in the personal address book if the setter has not set it.

The "sending destination setting information" is information specifying the name of a receiver of image data, and a sending method and a sending destination for the receiver.

There are two ways to specify the sending method and sending destination in the "sending destination setting information": one is that the user inputs individually a sending protocol/sending function and a network address/telephone number of the sending destination; the other is to specify information which specifies a sending method and a sending destination indicated by receiver setting information included in other user's personal address book (hereinafter, this information is referred to as "auto setting information"). Using either one of the methods, a user registers the sending destination setting information in the personal address book registration process to be hereinafter described.

Figure 6:
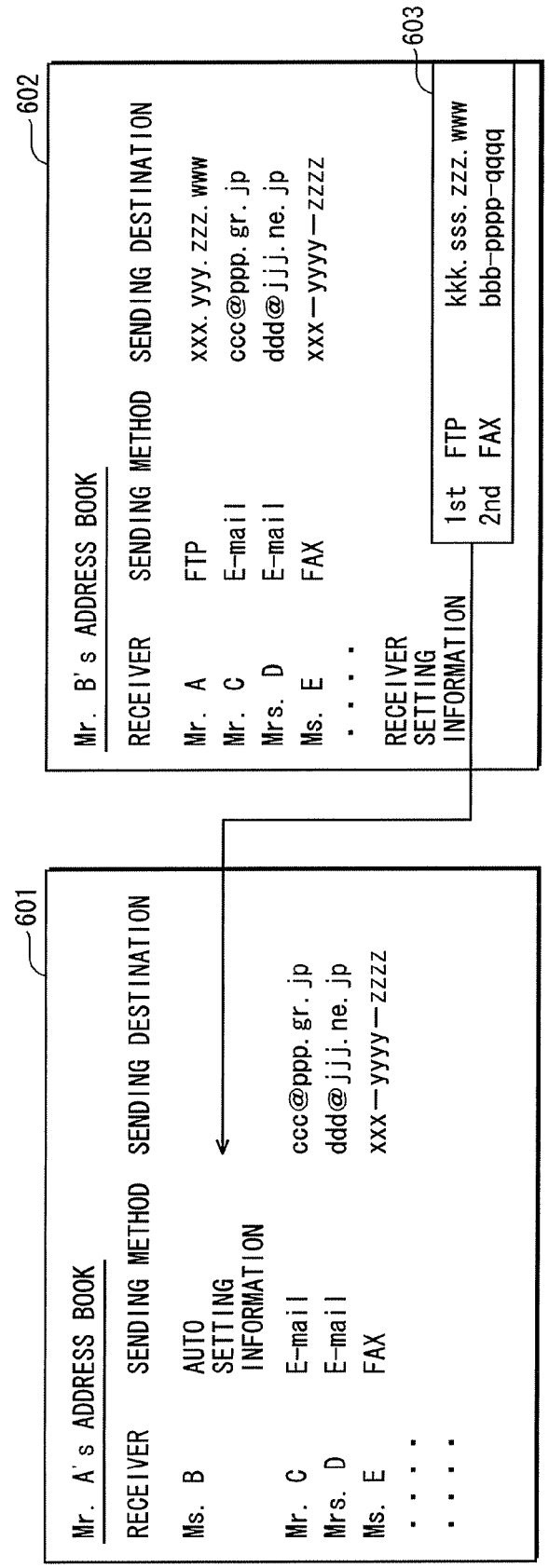
FIG. 6 shows a specific example of a personal address book.

The reference numeral 601 of FIG. 6A and the reference numeral 602 of FIG. 6B are specific examples of the personal address book. The reference numeral 601 is a personal address book whose setter (setting information) is "Mr. A" while the reference numeral 602 is a personal address book whose setter (setting information) is "Ms. B".

In the personal address book 601 of "Mr. A", the "auto setting information" is set for the receiver "Ms. B", which thereby specifies a sending method and a sending destination shown by the receiver setting information (here, denoted by the reference numeral 603) of the personal address book 602 of "Ms. B". The term "1" in the receiving setting information 603 indicates one to which the highest priority has been assigned, and the term "$2^{nd}$" indicates one to which the second highest priority has been assigned.

Herewith, in the image sending process to be hereinafter described, in the case of sending image data to "Ms. B" using the personal address book of "Mr. A" the image data is sent in accordance with the sending method and sending destination specified in the receiver setting information having been set by "Ms. B" in her own personal address book 602.

(Auto Address Book Storage 2032)

The auto address book storage 2032 stores therein an auto address book. Here, the "auto address book" is a list of setters of personal address books, who have set their receiver setting information (the list is hereinafter referred to as "receiving method setter list").

Figure 8:
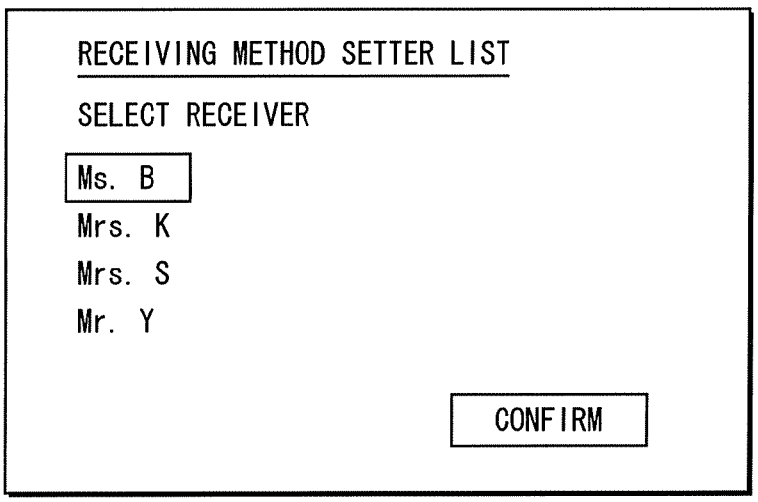
FIG. 8 shows a specific example of a receiving method setter list.

FIG. 8 shows a specific example of the receiving method setter list.

(Controller 204)

The controller 204 includes an apparatus information manager 2041 and an address book manager 2042.

(Apparatus Information Manager 2041)

The apparatus information manager 2041 performs a process of communicating, via the communication controller 201, with each image sending apparatus 100 connected to the LAN 101, obtaining sending function information stored in the sending function information storage 113, creating apparatus information based on the sending function information obtained from each image sending apparatus 100, and then recording the apparatus information in the apparatus information storage 202.

This process is performed periodically to update the apparatus information at every fixed time interval.

Additionally, in response to a request from each image sending apparatus 100 for a primary list/secondary list, the apparatus information manager 2041 creates a primary list/secondary list, and sends it to the requesting image sending apparatus 100 via the communication controller 201.

Here, the "primary list" is a list of sending methods executable on either one of the image sending apparatuses 100 included in the image sending system 1000; the "secondary list" is a list of sending methods executable on all image sending apparatuses 100 of the image sending system 1000, or is a list of sending methods executable on the largest number of image sending apparatuses 100 of the image sending system 1000 when there is no sending method executable on all the image sending apparatuses 100.

The apparatus information manager 2041 creates the primary list and secondary list in reference to the apparatus information stored in the apparatus information storage 202.

(Address Book Manager 2042)

When receiving, via the communication controller 201, a notification of the user's name and a request for obtaining the personal address book of the user in the personal address book registration process to be hereinafter described, the address book manager 2042 obtains, from the personal address book storage 2031, a personal address book having setter information whose setter name matches the notified user name, and sends the obtained address book to the requesting image sending apparatus 100 via the communication controller 201.

Additionally, each time one image sending apparatus 100 creates or updates a personal address book in the personal address book registration process to be hereinafter described, the address book manager 2042 performs a process of obtaining the personal address book from the image sending apparatus 100 via the communication controller 201 and then recording it in the personal address book storage 2031. At this point, each time the address book manager 2042 obtains a personal address book from an image sending apparatus 100, the address book manager 2042 judges whether a personal address book including the same setter information as that of the personal address book has been stored in the personal address book storage 2031. When it has been stored, the address book manager 2042 performs an update by overwriting the stored personal address book (i.e. the pre-update one) with the obtained personal address book (the post-update one); when it has not been stored, i.e. when the obtained personal address book is the one newly created, the address book manager 2042 records this obtained personal address book in the personal address book storage 2031.

In addition, for every predetermined time interval, the address book manager 2042 performs a process of searching personal address books stored in the personal address book storage 2031, extracting setter information of personal address books including receiver setting information, creating an auto address book and then storing it in the auto address book storage 2032.

Herewith, an auto address book created previously is rewritten for every predetermined time interval, to be updated to the most recent auto address book.

[Operation]

(Personal Address Book Registration Process)

Figure 12:
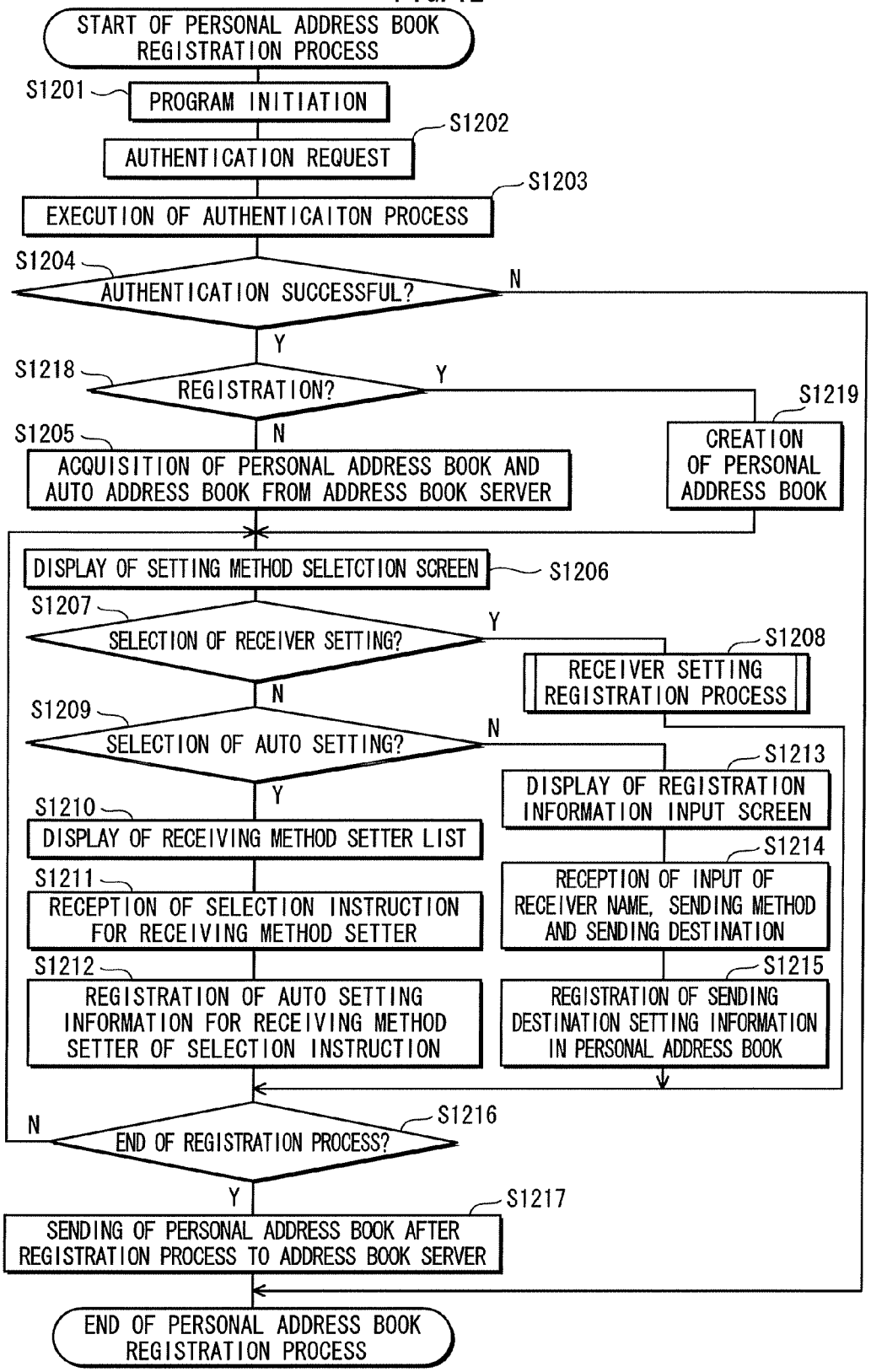
FIG. 12 is a flowchart showing operation of a personal address book registration process performed by a controller 120.

FIG. 12 is a flowchart showing operation of the personal address book registration process performed by the controller 120. The following describes this operation with reference to FIG. 12.

When an instruction for executing the personal address book registration process is input by the user via the operation panel 117, the controller 120 activates a computer program related to the process (Step S1201), causes the liquid crystal display 1171 of the operation panel 117 to display a GUI (Graphic User Interface) display screen to receive a specification of user authentication information, and requests input of authentication information (Step S1202).

When a user name and a password are input by the user as the authentication information via the operation panel 117, the controller 120 obtains, from the registered authentication information storage 112, registered authentication information corresponding to the input user name, performs an authentication process by checking the input authentication information against the registered authentication information (Step S1203), and judges whether the authentication is successful (Step S1204).

When the authentication is successful (Step S1204:Y) after the input authentication information and the registered authentication information are checked against each other, the controller 120 causes the liquid crystal display 1171 of the operation panel 117 to display a selection screen in GUI to prompt the user to select a registration method of a personal address book—i.e. either "new registration" or "update" of the personal address book, and thereby requests the user to input the selected registration method. When the "new registration" is selected (Step S1218:Y), the controller 120 creates a new personal address book indicating the user name of a user whose setter information has been authenticated (Step S1219); when the "update" is selected (Step S1218: N), the controller 120 communicates, via the communication controller 110, with the address book server 200 to notify the input user name thereto, requests the address book server 200 for a personal address book of the notifying user name, and obtains, from the address book server 200, the personal address book whose setter information includes a user name matching the notified user name as well as the auto address book (Step S1205).

Figure 7:
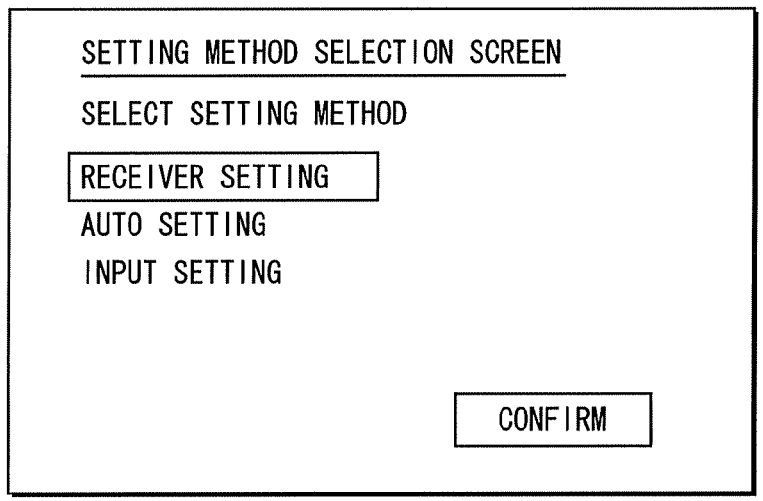
FIG. 7 shows a specific example of a setting method selection screen.

Then, the controller 120 causes the liquid crystal display 1171 of the operation panel 117 to display a setting method selection screen in GUI (Step S1206), like one shown in FIG. 7, to request input for selection of the setting method.

When "receiver setting" is selected (Step S1207: Y), the controller 120 performs a receiver setting registration process to be hereinafter described (Step S1208). When "auto setting" is selected (Step S1207: N and Step S1209: Y), the controller 120 creates a receiving method setter list, like one shown in FIG. 8, based on the obtained auto address book, causes the liquid crystal display 1171 of the operation panel 117 to display the created list in GUI (Step S1210), and requests a selection of a receiving method setter for the "auto setting".

When a selection of the receiving method setter is input by the user via the operation panel 117 (Step S1211), the controller 120 registers auto setting information in the obtained or created personal address book with respect to the selected receiving method setter (Step S1212).

With the auto setting information, a sending method and a sending destination specified by the receiver setting information included in the personal address book of the selected receiving method setter are specified as the sending method and sending destination of image data for the receiving method setter.

In Step S1209, if the auto setting is not selected (Step S1209: N), the controller 120 causes the liquid crystal display 1171 of the operation panel 117 to display a registration information input screen in GUI for registration of sending destination setting information in the personal address book (Step S1213), receives input of a receiver name as well as a sending method and a sending destination of the receiver via an input screen (Step S1214), then creates sending destination setting information based on the input information and registers the created information in the personal address book (Step S1215).

When an instruction for ending the personal address book registration process is input by the user via the operation panel 117 (Step S1216: Y) after Step S1208, S1212 or S1215, the controller 120 ends the process and sends, to the address book server 200 via the communication controller 110, the personal address book in which the sending destination setting information or receiver setting information has been registered (Step S1217). When in Step S1216 an instruction for continuing the personal address book registration process is received from the user via the operation panel 117, the controller 120 moves to Step S1206.

(Receiver Setting Registration Process)

Figure 13:
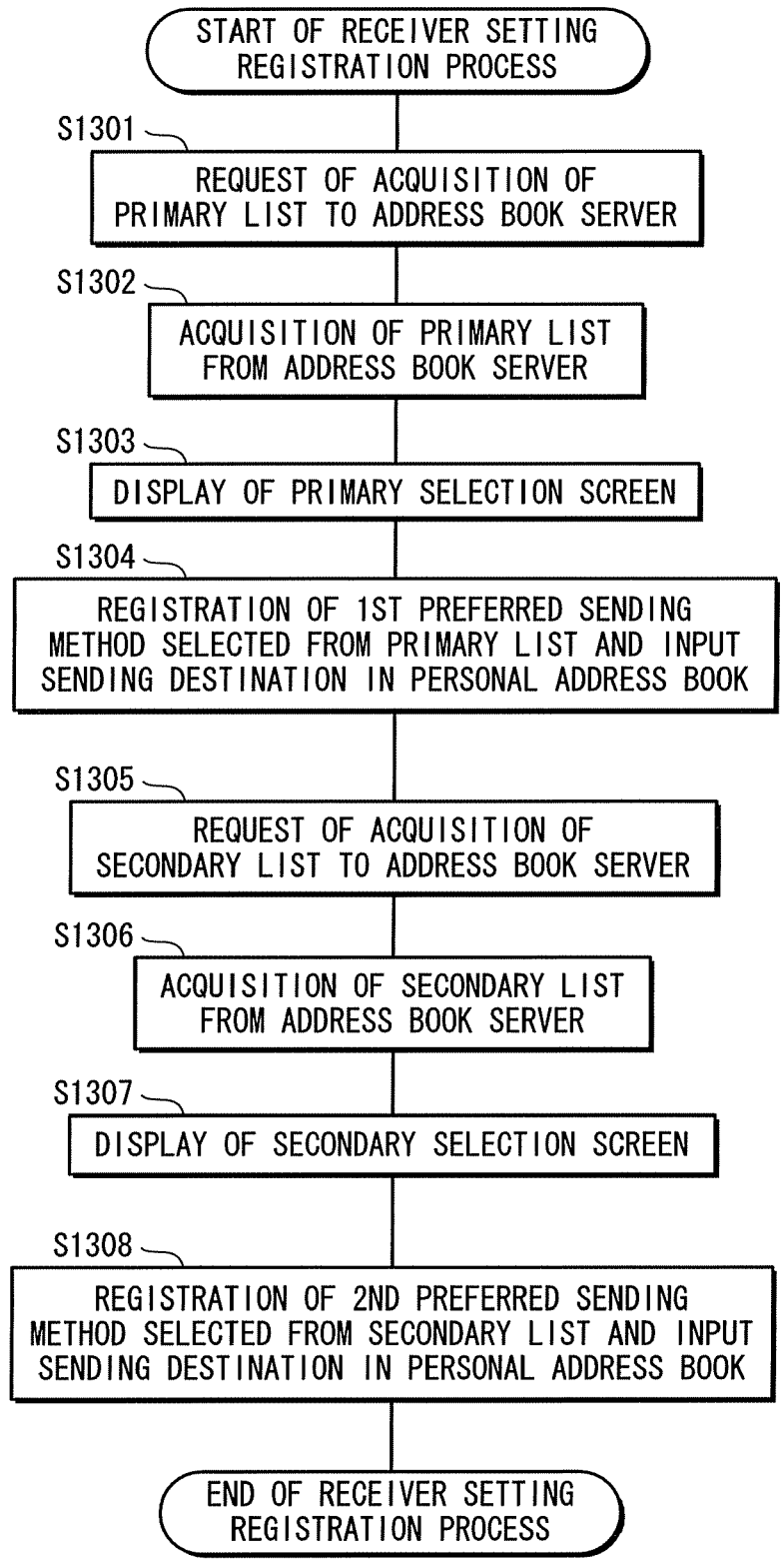
FIG. 13 is a flowchart showing operation of a receiver setting registration process performed by the controller 120

FIG. 13 is a flowchart showing operation of the receiver setting registration process performed by the controller 120. The following describes this operation with reference to FIG. 13.

Figure 10:
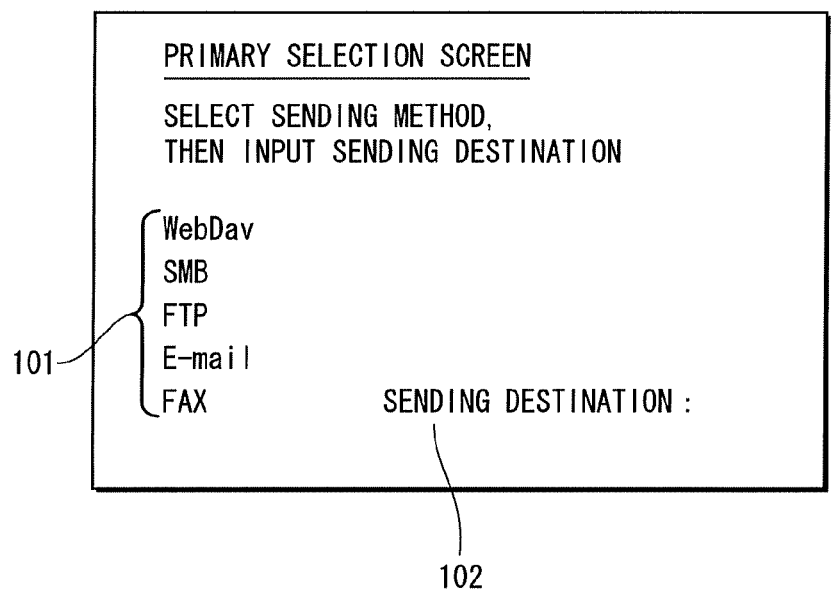
FIG. 10 shows a specific example of a primary selection screen.

When the "receiver setting" is selected in the operation of the personal address book registration process of FIG. 12 (Step S1207: Y), the controller 120 communicates, via the communication controller 110, with the address book server 200 and requests the address book server 200 for a primary list (Step S1301). According to Step S1403 of FIG. 14 to be hereinafter described, the controller 120 obtains the primary list from the address book server 200 (Step S1302), causes the liquid crystal display 1171 of the operation panel 117 to display a primary selection screen in GUI, like one shown in FIG. 10, based on the obtained primary list (Step S1303), and requests input for selection of a $1^{st}$ preferred sending method and its sending destination.

Here, the "primary selection screen" is a screen including therein a selection screen (part of FIG. 10, indicated by the reference numeral 101) of sending methods shown by the primary list and an input screen (part of FIG. 10, indicated by the reference numeral 102) for a sending destination to which sending is performed by the selected sending method.

Figure 11:
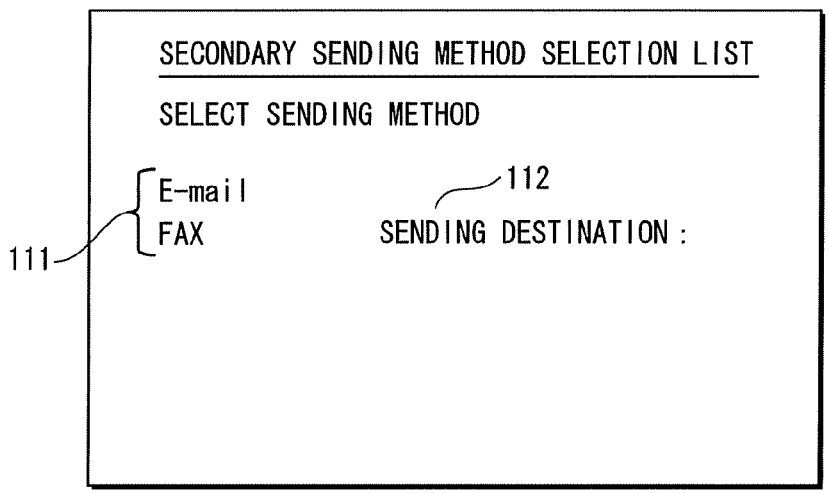
FIG. 11 shows a specific example of a secondary selection screen.

When a $1^{st}$ preferred sending method is selected by the user in the primary selection screen, and a sending destination for the selected sending method is input via the operation panel 117, the controller 120 registers the selected $1^{st}$ preferred sending method and the input sending destination in the personal address book (Step S1304), and then requests the address book server 200 for a secondary list by communicating therewith via the communication controller 110 (Step S1305). According to Step S1406 of FIG. 14 to be hereinafter described, the controller 120 obtains a secondary list from the address book server 200 (Step S1306), causes the liquid crystal display 1171 of the operation panel 117 to display a secondary selection screen in GUI, like one shown in FIG. 11, based on the obtained secondary list (Step S1307), and requests input for selection of a $2^{nd}$ preferred sending method and its sending destination.

Here, the "secondary selection screen" is a screen including therein a selection screen (part of FIG. 11, indicated by the reference numeral 111) of sending methods shown by the secondary list and an input screen (part of FIG. 11, indicated by the reference numeral 112) for a sending destination to which sending is performed by the selected sending method.

When a $2^{nd}$ preferred sending method is selected by the user in the secondary selection screen, and a sending destination for the selected sending method is input via the operation panel 117, the controller 120 registers the selected $2^{nd}$ preferred sending method and the input sending destination in the personal address book (Step S1308).

(Image Sending Process)

Figure 15:
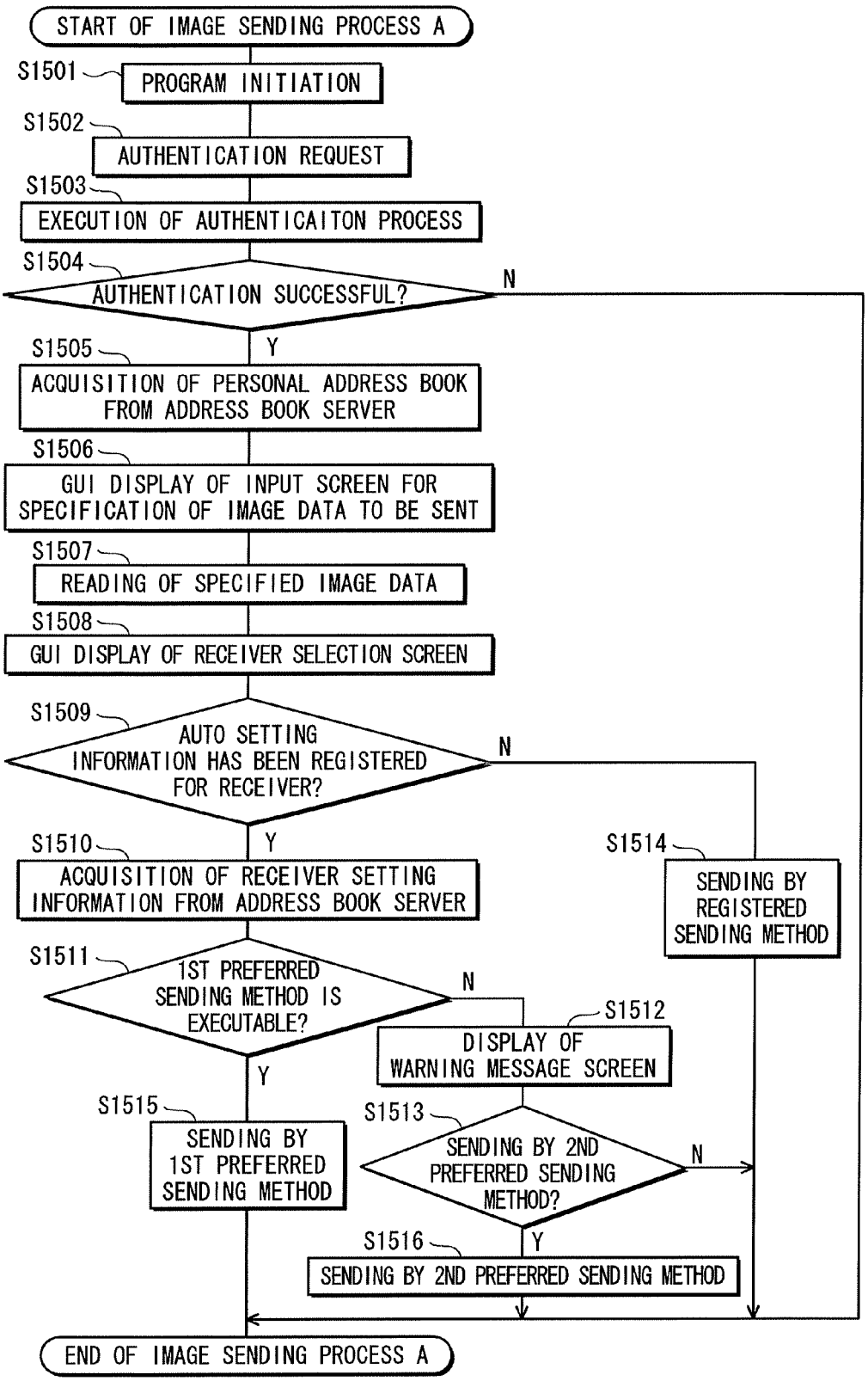
FIG. 15 is a flowchart showing operation of an image sending process A performed by the controller 120.

FIG. 15 is a flowchart showing operation of an image sending process A performed by the controller 120. The following describes this operation with reference to FIG. 15.

When an instruction for executing the image sending process A is input by the user via the operation panel 117, the controller 120 activates a computer program related to the process (Step S1501), causes the liquid crystal display 1171 of the operation panel 117 to display a GUI display screen to receive a specification of user authentication information, and requests input of authentication information (Step S1502).

When a user name and a password are input by the user as the authentication information via the operation panel 117, the controller 120 obtains, from the registered authentication information storage 112, registered authentication information corresponding to the input user name, performs an authentication process by checking the input authentication information against the registered authentication information (Step S1503), and judges whether the authentication is successful (Step S1504).

When the authentication is successful (Step S1504: Y) after the input authentication information and the registered authentication information are checked against each other, the controller 120 communicates, via the communication controller 110, with the address book server 200 to notify the input user name thereto, requests the address book server 200 for a personal address book of the notifying user name, obtains a corresponding personal address book from the address book server 200 (Step S1505), and causes the liquid crystal display 1171 of the operation panel 117 to display, in GUI, an input screen for specification of image data to be sent (Step S1506). When the user specifies sending image data in the input screen, the controller 120 reads the specified image data from the image storage 111 (Step S1507), creates a receiver selection screen, like one shown in FIG. 4, based on the obtained personal address book, causes the liquid crystal display 117 of the operation panel 117 to display the receiver selection screen in GUI (Step S1508), and requests a selection of a receiver name.

Figure 4:
FIG. 4 shows a specific example of a receiver selection screen.

In the receiver selection screen, a list of receiver names having been registered in the personal address book is displayed, as shown in FIG. 4.

When a receiver is selected by the user in the receiver selection screen and the selection is input via the operation panel 117, the controller 120 judges, in reference to the obtained personal address book, whether auto setting information has been registered for the receiver (Step S1509).

When the auto setting information has been registered (Step S1509: Y), the controller 120 communicates, via the communication controller 110, with the address book server 200 to notify the selected receiver thereto, requests the address book server 200 for receiver setting information registered in a personal address book in association with the receiver name, and obtains the receiver setting information from the address book server 200 (Step S1510). Then, the controller 1.20 judges whether a $1^{st}$ preferred sending method indicated by the receiver setting information is executable on its own image sending apparatus 100, based on whether the $1^{st}$ preferred sending method is included in sending function information stored in the sending function information storage 113 (Step S1511).

When the $1^{st}$ preferred sending method is included in the sending function information and is executable on the image sending apparatus 100 (Step S1511: Y), the controller 120 sends, by the $1^{st}$ preferred sending method, the read image data to a sending destination specified for this $1^{st}$ preferred sending method in the receiver setting information (Step S1515).

When the $1^{st}$ preferred sending method is not included in the sending function information and is not executable on the image sending apparatus 100 (Step S1511: N), the controller 120 indicates that the method cannot be executed, as shown in FIG. 17, and causes a GUI display of a warning message screen which inquires the user whether to switch to the $2^{nd}$ preferred one (Step S1512). If an instruction for sending by the $2^{nd}$ preferred sending method is selected by the user on this screen and then the instruction is input via the operation panel 117 (Step S1513: Y), the controller 120 sends, by the $2^{nd}$ preferred sending method, the read image data to a sending destination specified for this $2^{nd}$ preferred sending method in the receiver setting information (Step S1516).

In Step S1509, if the auto setting information has not been registered (Step S1509: N), the controller 120 sends, by a sending method having been registered in the obtained personal address book with respect to the selected receiver name, the read image data to a sending destination having been registered for this sending method (Step S1514).

Each sending in Steps S1514-1516 is performed via the fax communication controller 115 if the sending method is "fax", and via the communication controller 110 if the sending method is other than "fax".

Figure 5:
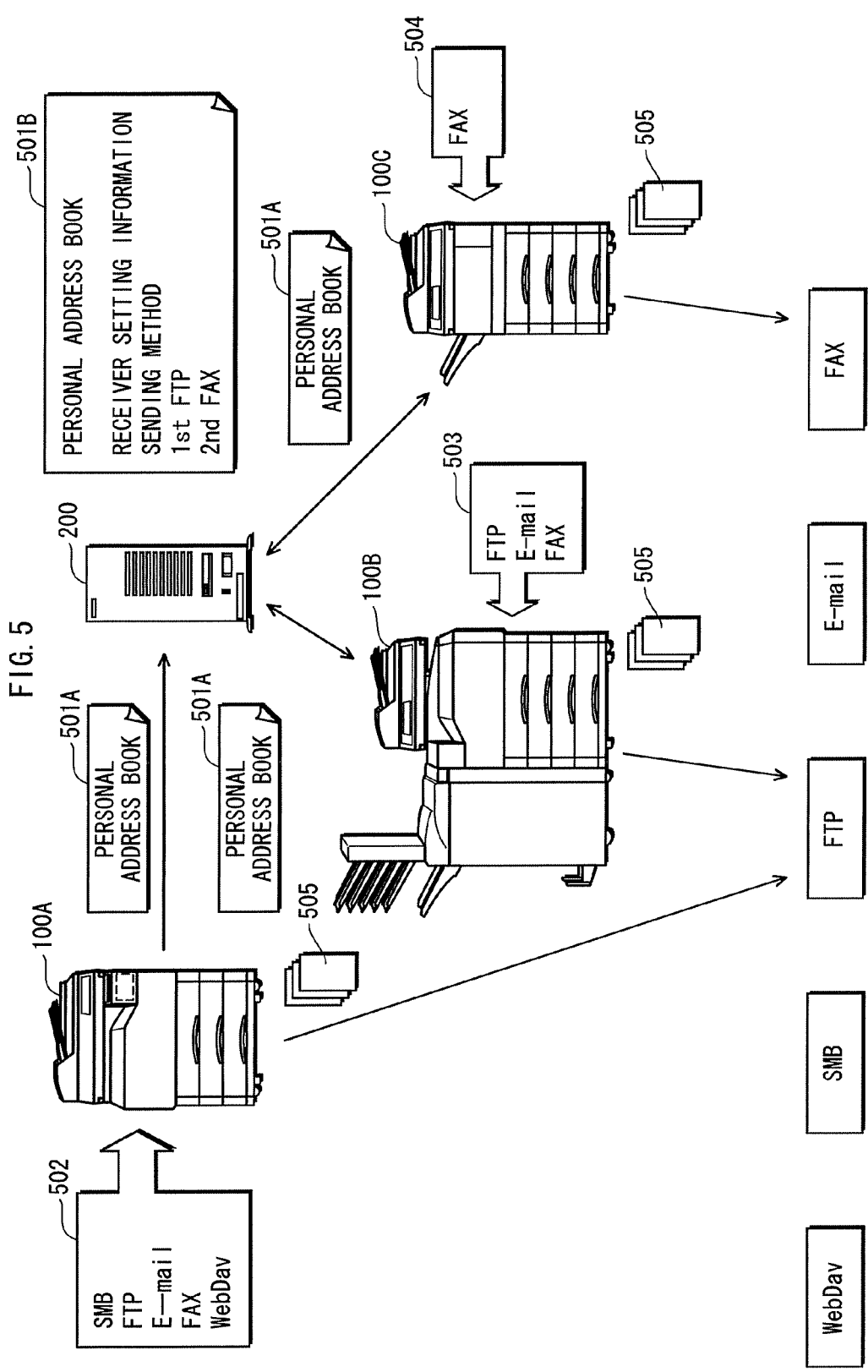
FIG. 5 illustrates a procedure in which an image sending process of FIG. 15 is performed on each image sending apparatus 100 of the image sending system 1000 to decide a sending method for image data.

FIG. 5 is an illustrative diagram in which the above-mentioned image sending process A is performed on respective image sending apparatuses 100 of the image sending system 1000 and sending methods of image data are determined.

The following describes a specific example of the image sending process A with the aid of FIG. 5.

In FIG. 5, the image sending system 1000 includes image sending apparatuses 100A, 100B and 100C, and the address book server 200.

The reference numeral 502 of FIG. 5 indicates contents of the sending function information of the image sending apparatus 100A; the reference numeral 503, contents of the sending function information of the image sending apparatus 100B; the reference numeral 504, contents of the sending function information of the image sending apparatus 100C; the reference numeral 505, sending image data; and the reference numerals 501A and 501B, personal address books having been registered in the address book server 200. Assume that in the personal address book 501A, a registrant of the personal address book 501B is specified as the receiver, and that auto setting information has been registered for this registrant.

In addition, receiver setting information has been registered in the personal address book 501B. In this receiver setting information, FTP is specified as the $1^{st}$ preferred sending method (corresponding to "1" in the personal address book 501B of FIG. 5); fax is specified as the $2^{nd}$ preferred sending method (corresponding to "$2^{nd}$").

When the user obtains, using the image sending apparatus 100A, his/her own personal address book 501A from the address book server 200 and selects the registrant of the personal address book 501B as the receiver, because the auto setting information has been registered for the registrant, the image sending apparatus 100A obtains, from the address book server 200, receiver setting information having been registered in the personal address book 501B of the registrant. Then, since "FTP" specified in the receiver setting information as the $1^{st}$ preferred sending method is included in the sending function information 502, the image sending apparatus 100A sends the sending image data 505 by FTP.

Also when the user performs the image sending process A using the image sending apparatus 100B, since FTP is included in the sending function information 503 of the image sending apparatus 100B, the image sending apparatus 100B sends the sending image data 505 by FTP, as in the case of using the image sending apparatus 100A.

On the other hand, in the case where the user performs the image sending process A using the image sending apparatus 100C, since FTP is not included in the sending function information 504 of the image sending apparatus 100C, the image sending apparatus 100C sends the sending image data 505 by fax, which is the $2^{nd}$ preferred sending method executable on itself, if the user has made an instruction for sending by the $2^{nd}$ preferred sending method.

Herewith, in the case where the image sending apparatus has a sending function to send the sending image data by a sending method set in advance by the receiver, the sending image data is sent preferentially the desirable sending method set by the receiver. If the image sending apparatus does not have a sending function to send the sending image data by the sending method set by the user, the sending image data is sent by a sending method that is executable on the image sending apparatus and has been secondarily selected by the receiver. As a result, when image data is to be sent in a use environment where multiple image sending apparatuses having different sending functions are used, an appropriate image sending method can be selected in consideration of sending methods preferred by the receiver as well as the difference in sending functions between the image sending apparatuses. Thus, the operation of selecting an image sending method can be optimized, reflecting the receiver's preference.

(Sending Method List Creation Process A)

Figure 14:
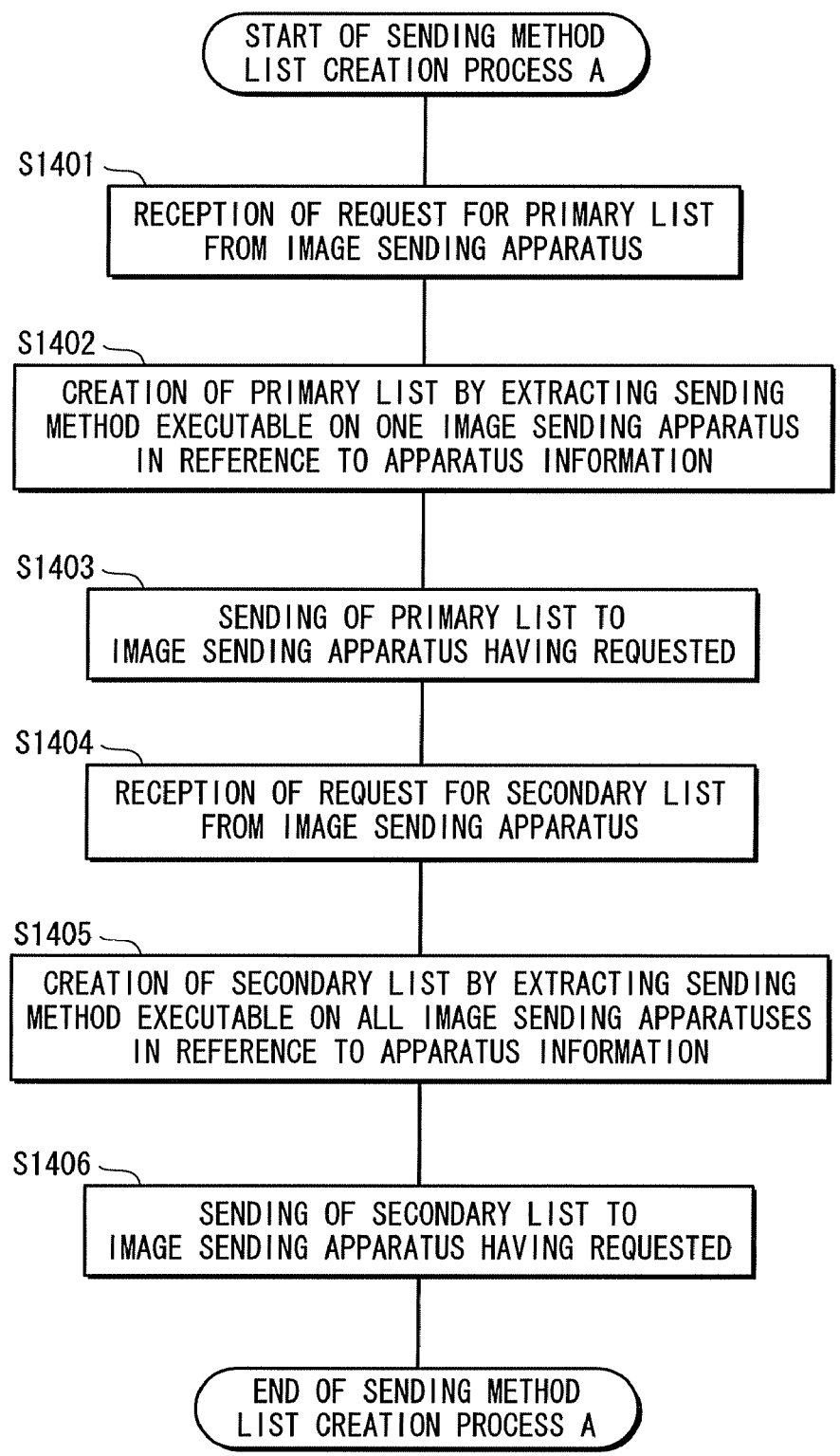
FIG. 14 is a flowchart showing operation of a sending method list creation process A performed by the address book server 200.

FIG. 14 is a flowchart showing operation of a sending method list creation process A performed by the address book server 200. The following describes this operation with reference to FIG. 14.

When receiving, in Step S1301 of FIG. 13, a request for a primary list from one image sending apparatus 100 (Step S1401), the address book server 200 creates a primary list by extracting, in reference to the apparatus information stored in the apparatus information storage 202, sending methods executable on either one of the image sending apparatuses 100 included in the image sending system 1000 (Step S1402), and sends the created primary list to the requesting image sending apparatus 100 (Step S1403). When further receiving, in Step S1305 of FIG. 13, a request for a secondary list from this image sending apparatus 100 (Step S1404), the address book server 200 creates a secondary list by extracting, in reference to the apparatus information stored in the apparatus information storage 202, sending methods executable on all image sending apparatuses 100 of the image sending system 1000 (Step S1405), and sends the created secondary list to the requesting image sending apparatus 100 (Step S1406).

[Additional Particulars]

The image sending system 1000 of the present invention has been described based on the above preferred embodiment; however, it is a matter of course the present invention is not limited to the embodiment.

(1) According to the embodiment, in the case of registering, with respect to the receiver, a sending method and a sending destination of the image data in the personal address book during the personal address book registration process, the image data is sent, in the image sending process, by a sending method in accordance to the receiver setting information specified by the receiver only when the registrant has registered auto setting information for the receiver (see Step S1212 of FIG. 12). However, if the receiver has registered the receiver setting information in the personal address book, the image data may be sent preferentially by the sending method specified by the receiver according to the receiver setting information, regardless of whether the auto setting information has been registered.

Figure 16:
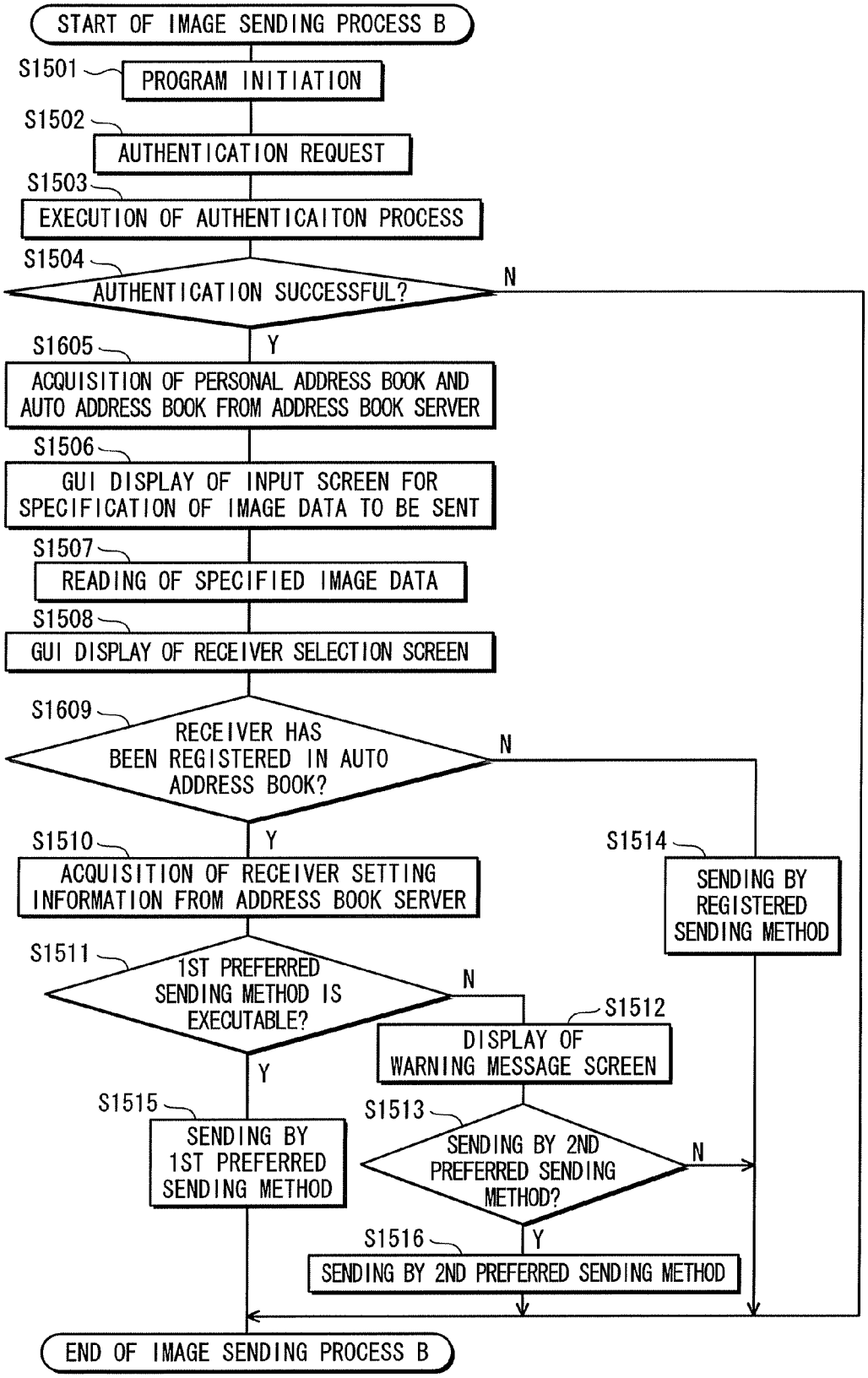
FIG. 16 is a flowchart showing operation of an image sending process B performed by the controller 120.

Specifically speaking, an image sending process B may be performed according to a flowchart shown in FIG. 16. FIG. 16 shows operation of the image sending process B performed by the controller 120. In FIG. 16, the same step numbers are given to identical processes with those in the image sending process A of FIG. 15; different step numbers are given to processes different from those in the image sending process A. The following describes the operation, focusing on the differences.

After performing Steps S1501-1504 and determines the authentication is successful (Step S1504: Y), the controller 120 communicates, via the communication controller 110, with the address book server 200 to notify the input user name, requests the address book server 200 for a personal address book of a notifying user name and the auto address book, and obtains a corresponding personal address book and the auto address book from the address book server 200 (Step S1605). After performing Steps S1506-1508, the controller 120 judges whether the selected receiver has been registered in the auto address book (Step S1609). The controller 120 moves to Step S1510 if it has been registered (Step S1609: Y) while moving to Step S1514 if it has not been registered (Step S1609: N), and subsequently performs the same process operation as shown in FIG. 15 (i.e. Steps S1510-S1513, S1515 and S1516).

Herewith, in the case when the receiver has registered its receiver setting information in the personal address book, the receiver's preference is reflected. As a result, by simply updating the receiver setting information according to need, the receiver can readily change the sending method and sending destination of image data addressed to himself/herself in a manner consistent with his/her preference, without taking the trouble to notify communication parties every time such a change is made.

(2) According to the embodiment, in the sending method list creation process, the sending methods included in the secondary list are ones executable on all image sending apparatuses 100 included in the image sending system 1000. However, the secondary list may be made up of sending methods executable commonly on, among all the image sending apparatuses 100, image sending apparatuses 100 that cannot execute the selected $1^{st}$ preferred sending method in the receiver setting registration process.

Figure 18:
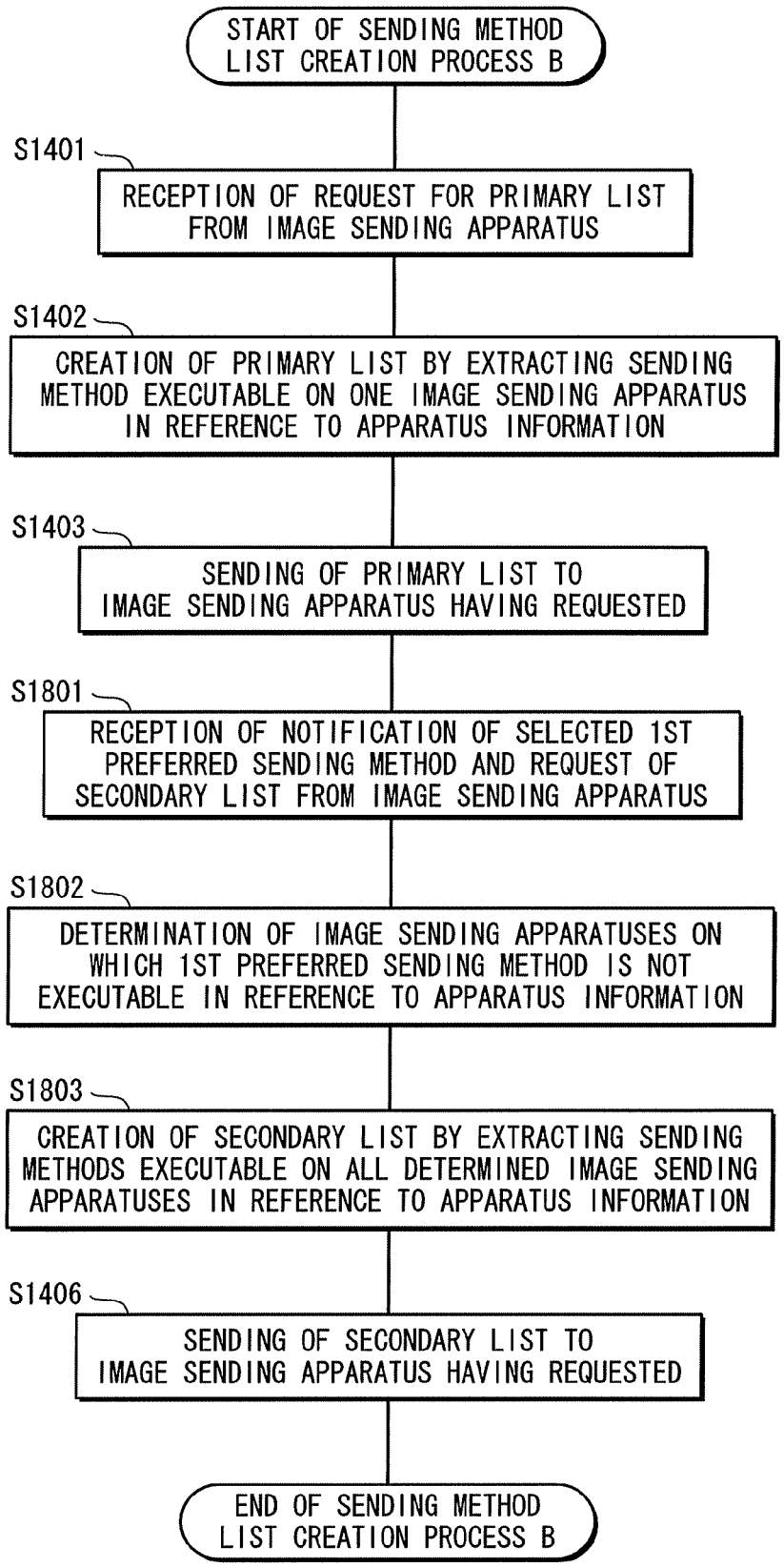
FIG. 18 is a flowchart showing operation of a sending method list creation process B performed by the address book server 200.

Specifically speaking, a sending method list creation process B may be performed according to a flowchart shown in FIG. 18. FIG. 18 shows operation of the sending method list creation process B performed by the controller 120. In FIG. 18, the same step numbers are given to identical processes with those in the sending method list creation process A of FIG. 14; different step number are given to processes different from those in the sending method list creation process A. The following describes the operation, focusing on the differences.

After performing Steps S1401-S1403 and sending the primary list to the requesting image sending apparatus 100, the address book server 200 receives, from the image sending apparatus 100, a notification of the $1^{st}$ preferred sending method selected in the receiver setting process and a request for the secondary list (Step S1801). Then, the address book server 200 determines, in reference to the apparatus information stored in the apparatus information storage 202, image sending apparatuses 100 on which the notified $1^{st}$ preferred sending method cannot be executed (Step S1802). Further, the address book server 200 extracts, from the apparatus information, sending methods commonly executable on the determined image sending apparatuses 100 (note: if only one image sending apparatus 100 is determined, a sending method executable on this image sending apparatus 100 is extracted), creates a secondary list (Step S1803), and moves to Step S1406.

Herewith, sending methods non-executable on all the image sending apparatuses 100 can also be included in the secondary list, which results in broadening the user's options for the $2^{nd}$ preferred sending method. As a result, the user is able to select a preferred sending method out of many more options.

(3) According to the embodiment, in the sending method list creation process, the sending methods included in the secondary list are ones executable on all image sending apparatuses 100 of the image sending system 1000. In the case, however, where there is no common sending method executable on all the image sending apparatuses 100, the secondary list may be created by extracting, in reference to the apparatus information, sending methods executable on the largest number of image sending apparatuses 100. Or alternatively, a threshold is set in advance, and the secondary list may be created by extracting, from the apparatus information, sending methods executable on the number of image sending apparatuses 100 exceeding the threshold.

(4) According to the embodiment, two types of specifications—the $1^{st}$ and $2^{nd}$ preferred—are made by a setter of the receiving setting information in relation to a sending method and a sending destination for image data addressed to the setter. The specifications are however not limited to two types, and may be more than two, e.g. three types of the $1^{st}$ to $3^{rd}$ preferred, or four types of the $1^{st}$ to $4^{th}$ preferred.

Specifically speaking, a sending method selected by the user from the secondary list of the embodiment may be set as the least preferred sending method (the $3^{rd}$ or $4^{th}$ preferred in the examples here), and the $1^{st}$ to $3^{rd}$ preferred sending methods may be selected in accordance with the weights given by the user. In the image sending process here, the same procedure as in the embodiment may be performed for each sending method in order of preference, and a sending method executable on the image sending apparatus and having the highest preference may be selected.

(5) According to the embodiment, in the image sending process, the judgment of whether the $1^{st}$ preferred sending method indicated by the receiver setting information is executable on the image sending apparatus 100 is made by the image sending apparatus 100 itself; however, this may be performed by the address book server 200.

Figure 20:
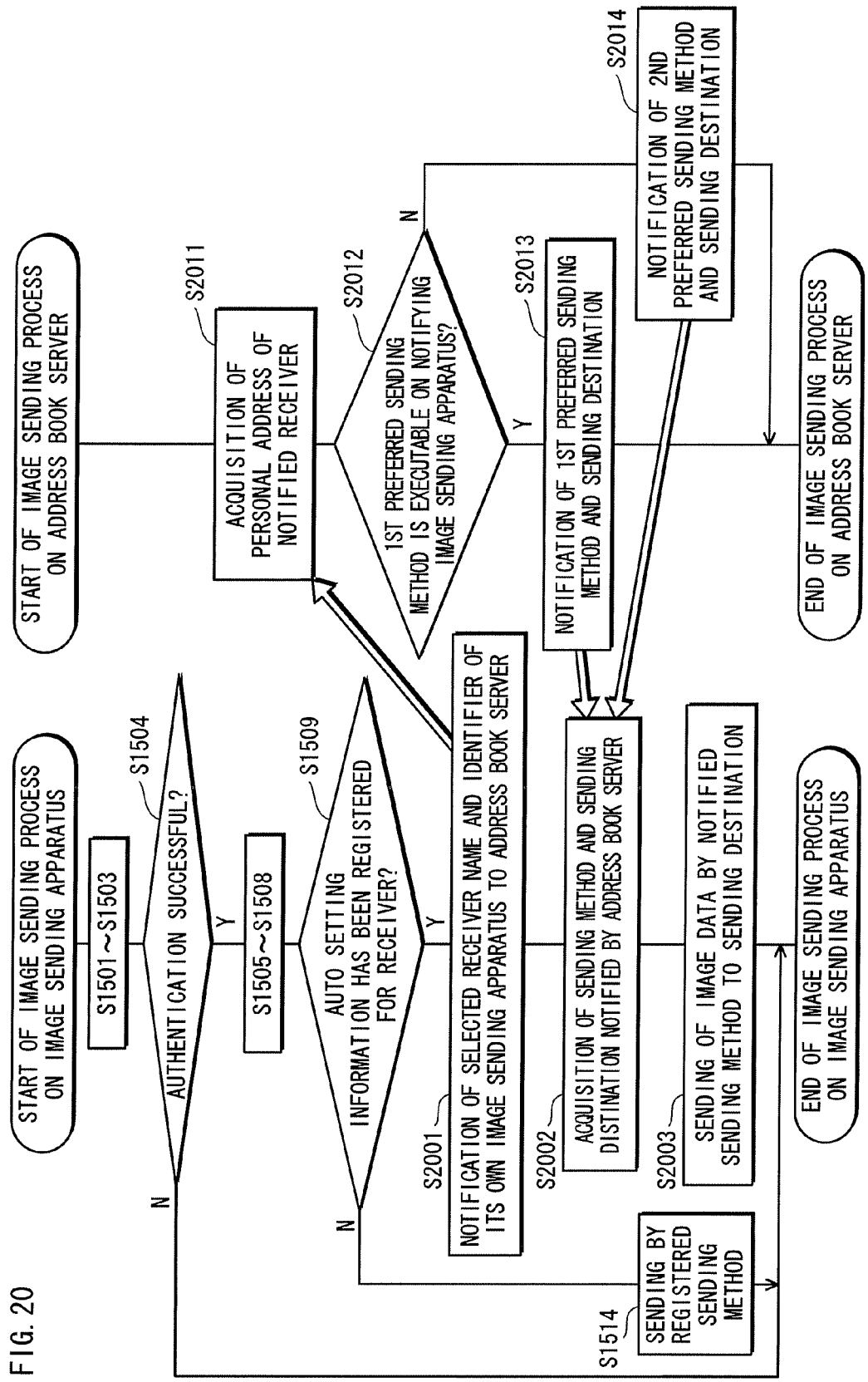
FIG. 20 is a flowchart showing operation of an image sending process performed by the image sending apparatus 100 and address book server 200.

Specifically speaking, an image sending process shown in the flowchart of FIG. 20 may be performed. FIG. 20 is a flowchart showing operation of an image sending process performed by the image sending apparatus 100 and the address book server 200.

In FIG. 20, the same step numbers (only numbers are shown) are given to identical processes with those in the image sending process A of FIG. 15, and their explanations are omitted. The following describes the operation, focusing on differences.

When the judgment result of Step S1509 is affirmative (Step S1509: Y), the controller 120 of the image sending apparatus 100 communicates, via the communication controller 110, with the address book server 200 to notify a selected receiver name and an identifier of the image sending apparatus 100 to the address book server 200 (Step S2001).

The address book server 200 obtains, from the address book storage 203, a personal address book having setter information whose setter name matches the notified receiver name (Step S2011), and judges whether the $1^{st}$ preferred sending method indicated by the receiver setting information having been registered in the personal address book is executable on the notifying image sending apparatus 100, in reference to the notified identifier and the apparatus information stored in the apparatus information storage 202 (Step S2012). When it is executable (Step S2012: Y), the address book server 200 informs the $1^{st}$ preferred sending method and its sending destination indicated by the receiver setting information to the notifying image sending apparatus 100 (Step S2013); when it is not executable (Step S2012: N), the address book server 200 informs the $2^{nd}$ preferred sending method and its sending destination indicated by the receiver setting information to the notifying image sending apparatus 100 (Step S2014).

Next, the controller 120 of the notifying image sending apparatus 100 obtains the sending method and sending destination informed by the address book server 200 (Step S2002), and sends specified image data to the informed sending destination by the sending method (Step S2003).

(6) According to the embodiment, in the sending method list creation process A, the primary list is created by extracting sending methods executable on either one of image sending apparatuses 100 of the image sending system 1000 (see Step S1402 of FIG. 14). Instead, the primary list may be created by extracting sending methods executable on a predetermined number or more of image sending apparatuses (Step S1902 of FIG. 19 to be hereinafter described).

Figure 19:
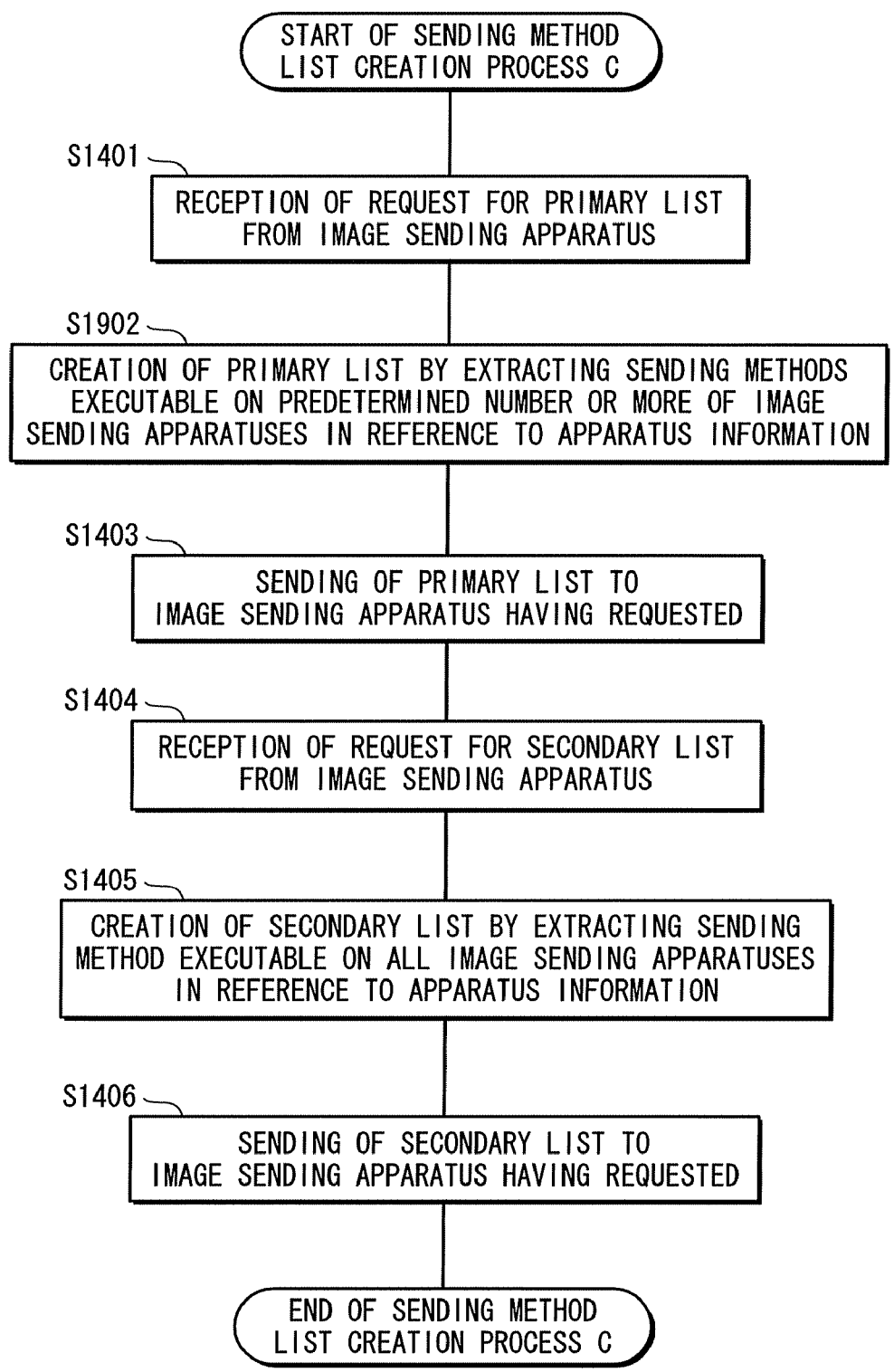
FIG. 19 is a flowchart showing operation of a sending method list creation process C performed by the address book server 200.

FIG. 19 is a flowchart showing operation of a modified version (sending method list creation process C) of the sending method list creation process A above. As shown in FIG. 19, except for Step S1902, the operation is the same as in the sending method list creation process A of FIG. 14.

What is claimed is:

1. An image sending system in which a server providing sending methods for image data and a plurality of image sending apparatuses are network-connected, wherein
the server includes:
a recording medium;
a registration update reception unit operable to receive a registration and an update of sending method specification information specified by a receiver and indicating a sending method for image data addressed to the receiver; and
a recording controller operable to, (i) when the registration is received, record on the recording medium the sending method specification information and an identifier of the receiver in association with each other, and (ii) when the update is received, rewrite the recorded sending method specification information with updated sending method specification information; and
each of the plurality of image sending apparatuses includes:
a selection reception unit operable to receive a selection of an identifier of a receiver of image data to be sent;
an obtaining unit operable to obtain from the server the recorded sending method specification information and identifier of the receiver; and
a sending controller operable to, when the identifier of the receiver in the received selection matches the obtained identifier of the receiver, send the image data to be sent by the sending method indicated by the obtained sending method specification information.

2. The image sending system of claim 1, wherein
the sending method specification information includes a plurality of sending methods, to which priority has been assigned, and
the sending controller includes:
a storage storing therein sending function information which indicates one or more sending methods executable on the image sending apparatus; and
a selection unit operable to, when the identifier of the receiver in the received selection matches the obtained identifier of the receiver, select in reference to the sending function information, as the sending method for the image data to be sent, a sending method which is executable on the image sending apparatus and to which highest priority has been assigned from among the plurality of sending methods.

3. The image sending system of claim 2, wherein
the sending method specification information includes, as a $1^{st}$ preferred sending method to which the highest priority has been assigned, a sending method executable on one of the plurality of image sending apparatuses, and as a $2^{nd}$ preferred sending method to which second highest priority has been assigned, a sending method executable on all of the plurality of image sending apparatuses.

4. The image sending system of claim 2, wherein
the sending method specification information includes, as a $1^{st}$ preferred sending method to which the highest priority has been assigned, a sending method executable on one of the plurality of image sending apparatuses, and as a $2^{nd}$ preferred sending method to which second highest priority has been assigned, a sending method executable commonly on, among the plurality of image sending apparatuses, image sending apparatuses that cannot execute the $1^{st}$ preferred sending method.

5. The image sending system of claim 3, wherein
the sending controller further includes:
a notification unit operable to, in a case where the $1^{st}$ preferred sending method cannot be executed on the image sending apparatus, notify to the user the $1^{st}$ preferred sending method being not executable on the image sending apparatus; and
an instruction reception unit operable to receive instruction of whether to use the $2^{nd}$ preferred sending method, and
the selection unit selects the $2^{nd}$ preferred sending method in a case where the instruction indicates use of the $2^{nd}$ preferred sending method.

6. The image sending system of claim 4, wherein
the sending controller further includes:
a notification unit operable to, in a case where the $1^{st}$ preferred sending method cannot be executed on the image sending apparatus, notify to the user the $1^{st}$ preferred sending method being not executable on the image sending apparatus; and
an instruction reception unit operable to receive instruction of whether to use the $2^{nd}$ preferred sending method, and
the selection unit selects the $2^{nd}$ preferred sending method in a case where the instruction indicates use of the $2^{nd}$ preferred sending method.

7. An image sending apparatus network-connected to a server providing sending methods for image data, wherein
the server (i) includes a recording medium, (ii) receives a registration and an update of sending method specification information specified by a receiver and indicating a sending method for image data addressed to the receiver, (iii) records on the recording medium, when the registration is received, the sending method specification information and an identifier of the receiver in association with each other, and (iv) rewrites, when the update is received, the recorded sending method specification information with updated sending method specification information, and
the image sending apparatus comprising:
a selection reception unit operable to receive a selection of an identifier of a receiver of image data to be sent;
an obtaining unit operable to obtain from the server the recorded sending method specification information and identifier of the receiver; and
a sending controller operable to, when the identifier of the receiver in the received selection matches the obtained identifier of the receiver, send the image data to be sent by the sending method indicated by the obtained sending method specification information.

8. The image sending apparatus of claim 7, wherein
the server is connected to a plurality of image sending apparatuses in which the image sending apparatus is included,
the sending method specification information includes a plurality of sending methods, to which priority has been assigned, and
the sending controller includes:
a storage storing therein sending function information which indicates one or more sending methods executable on the image sending apparatus; and
a selection unit operable to, when the identifier of the receiver in the received selection matches the obtained identifier of the receiver, select in reference to the sending function information, as the sending method for the image data to be sent, a sending method which is executable on the image sending apparatus and to which highest priority has been assigned from among the plurality of sending methods.

9. The image sending apparatus of claim 8, wherein
the sending method specification information includes, as a $1^{st}$ preferred sending method to which the highest priority has been assigned, a sending method executable on one of the plurality of image sending apparatuses, and as a $2^{nd}$ preferred sending method to which second highest priority has been assigned, a sending method executable on all of the plurality of image sending apparatuses.

10. The image sending apparatus of claim 8, wherein
the sending method specification information includes, as a $1^{st}$ preferred sending method to which the highest priority has been assigned, a sending method executable on one of the plurality of image sending apparatuses, and as a $2^{nd}$ preferred sending method to which second highest priority has been assigned, a sending method executable commonly on, among the plurality of image sending apparatuses, image sending apparatuses that cannot execute the $1^{st}$ preferred sending method.

11. The image sending apparatus of claim 9, wherein
the sending controller further includes:
a notification unit operable to, in a case where the $1^{st}$ preferred sending method cannot be executed on the image sending apparatus, notify to the user the $1^{st}$ preferred sending method being not executable on the image sending apparatus; and
an instruction reception unit operable to receive instruction of whether to use the $2^{nd}$ preferred sending method, and
the selection unit selects the $2^{nd}$ preferred sending method in a case where the instruction indicates use of the $2^{nd}$ preferred sending method.

12. The image sending apparatus of claim 10, wherein
the sending controller further includes:
a notification unit operable to, in a case where the $1^{st}$ preferred sending method cannot be executed on the image sending apparatus, notify to the user the $1^{st}$ preferred sending method being not executable on the image sending apparatus; and
an instruction reception unit operable to receive instruction of whether to use the $2^{nd}$ preferred sending method, and
the selection unit selects the $2^{nd}$ preferred sending method in a case where the instruction indicates use of the $2^{nd}$ preferred sending method.

13. An image sending method used on an image sending apparatus network-connected to a server providing sending methods for image data, wherein
the server (i) includes a recording medium, (ii) receives a registration and an update of sending method specification information specified by a receiver and indicating a sending method for image data addressed to the receiver, (iii) records on the recording medium, when the registration is received, the sending method specification information and an identifier of the receiver in association with each other, and (iv) rewrites, when the update is received, the recorded sending method specification information with updated sending method specification information, and
the image sending method comprising:
a selection reception step of receiving a selection of an identifier of a receiver of image data to be sent;
an obtaining step of obtaining from the server the recorded sending method specification information and identifier of the receiver; and a sending control step of, when the identifier of the receiver in the received selection matches the obtained identifier of the receiver, sending the image data to be sent by the sending method indicated by the obtained sending method specification information.

14. The image sending method of claim 13, wherein the server is connected to a plurality of image sending apparatuses in which the image sending apparatus is included, each of the plurality of image sending apparatuses has a storage storing therein sending function information which indicates one or more sending methods executable on the image sending apparatus, the sending method specification information includes a plurality of sending methods, to which priority has been assigned, and a selection step of, when the identifier of the receiver in the received selection matches the obtained identifier of the receiver, selecting in reference to the sending function information, as the sending method for the image data to be sent, a sending method which is executable on the image sending apparatus and to which highest priority has been assigned from among the plurality of sending methods.

15. The image sending method of claim 14, wherein the sending method specification information includes, as a $1^{st}$ preferred sending method to which the highest priority has been assigned, a sending method executable on one of the plurality of image sending apparatuses, and as a $2^{nd}$ preferred sending method to which second highest priority has been assigned, a sending method executable on all of the plurality of image sending apparatuses.

16. The image sending method of claim 14, wherein the sending method specification information includes, as a $1^{st}$ preferred sending method to which the highest priority has been assigned, a sending method executable on one of the plurality of image sending apparatuses, and as a $2^{nd}$ preferred sending method to which second highest priority has been assigned, a sending method executable commonly on, among the plurality of image sending apparatuses, image sending apparatuses that cannot execute the $1^{st}$ preferred sending method.

17. The image sending method of claim 15, wherein the sending control step further includes:

a notification step of, in a case where the $1^{st}$ preferred sending method cannot be executed on the image sending apparatus, notifying to the user the $1^{st}$ preferred sending method being not executable on the image sending apparatus; and an instruction reception step of receiving instruction of whether to use the $2^{nd}$ preferred sending method, and the selection step of selecting the $2^{nd}$ preferred sending method in a case where the instruction indicates use of the $2^{nd}$ preferred sending method.

18. The image sending method of claim 16, wherein the sending control step further includes:

a notification step of, in a case where the $1^{st}$ preferred sending method cannot be executed on the image sending apparatus, notifying to the user the $1^{st}$ preferred sending method being not executable on the image sending apparatus; and an instruction reception step of receiving instruction of whether to use the $2^{nd}$ preferred sending method, and the selection step of selecting the $2^{nd}$ preferred sending method in a case where the instruction indicates use of the 2 nd preferred sending method.

* * * * *